United States Patent
Saleh et al.

(10) Patent No.: US 9,856,334 B2
(45) Date of Patent: Jan. 2, 2018

(54) CYCLOPOLYMERIC ZWITTERION-DIANIONIC RESIN AND SYNTHESIS AND USES THEREOF

(71) Applicant: KING FAHD UNIVERSITY OF PETROLEUM AND MINERALS, Dhahran (SA)

(72) Inventors: Tawfik Abdo Saleh, Dhahran (SA); Shaikh Asrof Ali, Dhahran (SA); Shamsuddeen Abdullahi Haladu, Khobar (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 257 days.

(21) Appl. No.: 14/993,511

(22) Filed: Jan. 12, 2016

(65) Prior Publication Data

US 2017/0197847 A1   Jul. 13, 2017

(51) Int. Cl.
| | |
|---|---|
| C08F 26/02 | (2006.01) |
| C08F 26/06 | (2006.01) |
| C08F 226/02 | (2006.01) |
| C08F 226/06 | (2006.01) |
| B01J 20/26 | (2006.01) |
| C02F 1/42 | (2006.01) |
| C02F 1/52 | (2006.01) |
| C08F 230/02 | (2006.01) |
| C02F 1/68 | (2006.01) |

(Continued)

(52) U.S. Cl.
CPC ........... *C08F 26/06* (2013.01); *B01J 20/261* (2013.01); *B01J 20/267* (2013.01); *B01J 39/00* (2013.01); *C02F 1/285* (2013.01); *C02F 1/42* (2013.01); *C02F 1/683* (2013.01); *C08F 30/02* (2013.01); *C08F 226/02* (2013.01); *C08F 230/02* (2013.01); *C02F 1/66* (2013.01); *C02F 2101/20* (2013.01)

(58) Field of Classification Search
None
See application file for complete search history.

(56) References Cited

U.S. PATENT DOCUMENTS

| | | | |
|---|---|---|---|
| 8,871,822 B2 | 10/2014 | Ali et al. | |
| 8,937,104 B2 | 1/2015 | Ali et al. | |
| 9,120,094 B2 | 9/2015 | Ali et al. | |

OTHER PUBLICATIONS

Tawfik A. Saleh, et al., "A novel cross-linked pH-responsive tetrapolymer: Synthesis, characterization and sorption evaluation towards Cr(III)", Chemical Engineering Journal, vol. 269, 2015, pp. 9-19.

(Continued)

*Primary Examiner* — Clare Perrin
(74) *Attorney, Agent, or Firm* — Oblon, McClelland, Maier & Neustadt, L.L.P.

(57) ABSTRACT

Cross-linked cyclopolymeric resins from N,N-diallyl quaternary ammonium monomers and tetrallylpiperazinium cross-linking monomer or salts, solvates, tautomers or stereoisomers as adsorbent materials for the removal of heavy metals from aqueous solution. A process for producing the cross-linked cyclopolymeric resins by Butler cyclocopolymerization of the monomers with a free radical initiator. The cross linked cyclopolymeric resins are polyzwitterionic or polyzwitterionic and dianionic and feature repeating units with multiple chelating centers that heavy metal ions can bind to. In addition, a method for removing heavy metals from aqueous solution via contacting and treatment with the cross-linked cyclopolymeric resins.

20 Claims, 8 Drawing Sheets

(51) Int. Cl.
*C02F 1/28* (2006.01)
*C08F 30/02* (2006.01)
*B01J 39/00* (2006.01)
B01J 20/00 (2006.01)
B01J 20/22 (2006.01)
B01D 21/01 (2006.01)
C02F 1/00 (2006.01)
B01J 49/00 (2017.01)
B01D 39/20 (2006.01)
B01D 15/00 (2006.01)
B03D 3/00 (2006.01)
C02F 101/20 (2006.01)
C02F 1/66 (2006.01)

(56) References Cited

OTHER PUBLICATIONS

Shamsuddeen A. Haladu, et al., "A pH-Responsive Cyclopolymer Having Phospho- and Sulfopropyl Pendents in the Same Repeating Unit: Synthesis, Characterization, and Its Application as an Antiscalant", Journal of Polymer Science, Part A: Polymer Chemistry, vol. 51, 2013, pp. 5130-5142.

Shaikh A. Ali, et al., "Synthesis, solution properties and scale-inhibiting behaviour of a diallylammonium/sulfur dioxide cyclocopolymer bearing phospho- and sulfopropyl pendents", Polym. Int., vol. 63, 2014, pp. 1682-1690.

| Element | Apparent Conc | k Ratio | Wt% | Wt% Sigma |
|---|---|---|---|---|
| C | 5.68 | 0.0568 | 50.78 | 1.24 |
| N | 0.62 | 0.0011 | 2.21 | 1.73 |
| O | 9.92 | 0.0333 | 30.85 | 0.91 |
| Na | 3.92 | 0.0165 | 5.70 | 0.22 |
| P | 4.66 | 0.0260 | 5.03 | 0.24 |
| S | 3.09 | 0.0266 | 5.42 | 0.25 |
| Total: | | | 100.00 | |

CYCLOPOLYMERIC ZWITTERION-DIANIONIC RESIN AND SYNTHESIS AND USES THEREOF

BACKGROUND OF THE INVENTION

Technical Field

The present disclosure relates to cross-linked cyclopolymeric resins having a structure with phospho- and sulfo-pendents with zwitterionic (±) and/or zwitterionic (±) and dianionic groups present in the same repeating unit as well as methods for their synthesis and preparation. Additionally, the present disclosure relates to applications of these cross-linked cyclopolymeric resins as agents for the removal of heavy metals from aqueous solutions.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Heavy metal ion pollution is one of the rising phenomena currently facing humanity due to increasing industrialization, urbanization and other human activities. There are over twenty elements that are classified by the United States Environmental Protection Agency (EPA) as of an environmental and health concern [Akpor, O. and M. Muchie, *Remediation of heavy metals in drinking water and wastewater treatment systems: Processes and applications.* International Journal of Physical Sciences, 2010. 5(12): p. 1807-1817.—incorporated herein by reference in its entirety]. One such element is nickel (Ni). Nickel (atomic number 28) belongs to group X along with iron in the periodic table. It has a crystalline structure and is a silver-grayish solid with a high polish normally found below the earth's crust (i.e. soils and volcanic rocks). It has an atomic weight of 58.71 g/mol, a specific grabity of 8.9, a melting point (MP) of 1728 K, and a boiling point (BP) of 3186 K [Keng, P.-S., et al., *Cheap materials to clean heavy metal polluted waters, in Green Materials for Energy, Products and Depollution.* 2013, Springer. p. 335-414.—incorporated herein by reference in its entirety]. Various compounds of nickel have been used for a number of industrial applications which include electroplating, manufacturing of automobile and aircraft parts, batteries, coins, spark plugs, cosmetics, stainless steel, and the industrial scale production of nickel-cadmium batteries.

Like any heavy metal, nickel is toxic and non-biodegradable and usually enters into the environment as a result of anthropogenic activities. An alternative route of entering into the environment is through the weathering of racks and soils and leaching of the minerals [Dojlido, J. and G. A. Best, *Chemistry of water and water pollution.* 1993: Ellis Horwood Limited.—incorporated herein by reference in its entirety]. Nickel is known to be the cause of "Nickel Itch" (a form of skin irritation and reaction) and is also indicated in other maladies such as asthma, conjunctivitis (pink eye) and inflammatory responses and reactions. Nickel salts when swallowed induce vomiting, and as such act as emetics. A concentration of at least 30 mg can cause changes in vital organs and can reduce function of the muscle, brain, lungs, liver, kidney, etc. and eventually lead to death [VARMA, S., et al., *Removal of Nickel from Waste Water Using Graphene Nanocomposite.*—incorporated herein by reference in its entirety]. The World Health Organization (WHO) has set the allowable toxicity limits of nickel in the form of Ni (II) as 1.0 mg/m$^3$ (insoluble compounds), 0.1 mg/m$^3$ (soluble compounds), 0.05-0.12 mg/m$^3$ (carbonyl compounds) and 1.0 mg/m$^3$ (nickel sulfide).

A number of technologies are in use to remove pollutants in water including, reverse osmosis, electro dialysis and bioremediation, etc. Adsorption using various adsorbents been receiving increased attention by many researchers as an effective method for the removal of both organic and heavy metal pollutants from water [Kyzas, G. Z. and M. Kostoglou, *Green Adsorbents for Wastewaters: A Critical Review.* Materials, 2014. 7(1): p. 333-364.; and Aly, H. and A. Daifullah, *Potential use of bagasse pith for the treatment of wastewater containing metals.* Adsorption science & technology, 1998. 16(1): p. 33-38.; and Daneshvar, N., D. Salari, and S. Aber, *Chromium adsorption and Cr (VI) reduction to trivalent chromium in aqueous solutions by soya cake.* Journal of Hazardous Materials, 2002. 94(1): p. 49-61.; and Gupta, V. K., et al., *Removal of cadmium and nickel from wastewater using bagasse fly ash—a sugar industry waste.* Water Research, 2003. 37(16): p. 4038-4044.; and Borhade, A N., et al., *Removal of Heavy Metals $Cd^{2+}$, $Pb^{2+}$, and $Ni^{2+}$ From Aqueous Solutions Using Synthesized Azide Cancrinite, $Na_8[AlSiO_4]_6(N_3)_{2.4}(H_2O)_{4.6}$.* Journal of Chemical & Engineering Data, 2015.; and Boyd, G., A. Adamson, and L. Myers Jr, *The exchange adsorption of ions from aqueous solutions by organic zeolites. II. Kinetics1.* Journal of the American Chemical Society, 1947. 69(11): p. 2836-2848.— each incorporated herein by reference in its entirety]. Some of these adsorbents have certain limitations such as a longer equilibrium time, a low adsorption capacity, high cost and/or poor recovery [Jiang, J.-Q. and S. Ashekuzzaman, *Development of novel inorganic adsorbent for water treatment.* Current Opinion in Chemical Engineering, 2012. 1(2): p. 191-199.—incorporated herein by reference in its entirety].

Polymers have been used extensively in wastewater treatment facilities and as such effort has been devoted to the development of novel polymer adsorbents to increase their sorption potential and performance [Ulusoy, U. and R. Akkaya, *Adsorptive features of polyacrylamide-apatite composite for $Pb^{2+}$, $UO_2^{2+}$ and $Th^{4+}$.* Journal of hazardous materials, 2009. 163(1): p. 98-108.; and Pan, B., et al., *Development of polymeric and polymer-based hybrid adsorbents for pollutants removal from waters.* Chemical Engineering Journal, 2009. 151(1): p. 19-29.; and Bai, H., C. Li, and G. Shi, *Functional composite materials based on chemically converted graphene.* Advanced Materials, 2011. 23(9): p. 1089-1115.; and Ali, S. A., N. Abu-Thabit, and H. A. Al-Muallem, *Synthesis and solution properties of a pH-responsive cyclopolymer of zwitterionic ethyl 3-(N,N-diallylammonio) propanephosphonate.* Journal of Polymer Science Part A: Polymer Chemistry, 2010. 48(24): p. 5693-5703.; and Ali, S. A. and S. A. Haladu, *A novel cross-linked polyzwitterion/anion having pH-responsive carboxylate and sulfonate groups for the removal of $Sr^{2+}$s from aqueous solution at low concentrations.* Reactive and Functional Polymers, 2013. 73(6): p. 796-804.—each incorporated herein by reference in its entirety].

In view of the forgoing, one object of the present disclosure is to provide a cross-linked cyclopolymeric resin. Another object of the present disclosure is to provide a process for producing the cross-linked cyclopolymeric resins featuring phospho- and sulfo-propyl pendents with zwitterionic (±) and/or zwitterionic (±) and dianionic groups present in the same repeating unit (FIG. 1) by the use of Butler's cyclopolymerization protocol. In addition to the cross-linked cyclopolymeric resins and methods for their preparation, the present disclosure further aims to provide methods for efficiently removing (adsorbing) heavy metals, specifically Ni (II) ions, from an aqueous solution by contacting the aqueous media with the cross-linked cyclopolymeric resins described herein.

BRIEF SUMMARY OF THE INVENTION

According to a first aspect, the present disclosure relates to a cross-linked cyclopolymeric resin of formula (I)

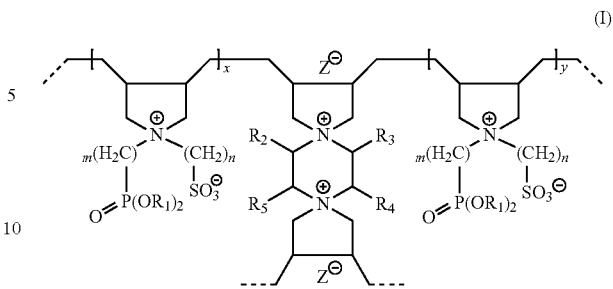

(I)

or a salt, solvate, tautomer or stereoisomer thereof wherein i) each $R_1$ is —H, a positive counter ion, an optionally substituted alkyl, an optionally substituted cycloalkyl, or an optionally substituted aryl, ii) $R_2$, $R_3$, $R_4$, and $R_5$ are independently —H, an optionally substituted alkyl, optionally substituted cycloalkyl, or an optionally substituted aryl, iii) m and n are independently a whole number in the range of 1-10, iv) x and y are independently a whole number greater than zero, and v) Z is a counter ion.

In one embodiment, each $R_1$ is —H, $R_2$ is —H, $R_3$ is —H, $R_4$ is —H, $R_5$ is —H, m is 3, n is 3, x and y are independently a whole number greater than zero and Z is $Cl^-$ and the cross-linked cyclopolymeric resin of formula (I) is

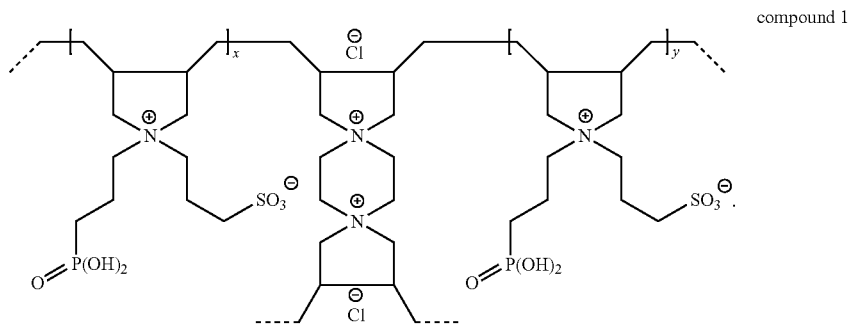

compound 1

In one embodiment, each $R_1$ is $Na^+$, $R_2$ is —H, $R_3$ is —H, $R_4$ is —H, $R_5$ is —H, m is 3, n is 3, x and y are independently a whole number greater than zero and Z is $OH^-$ and the cross-linked cyclopolymeric resin of formula (I) is

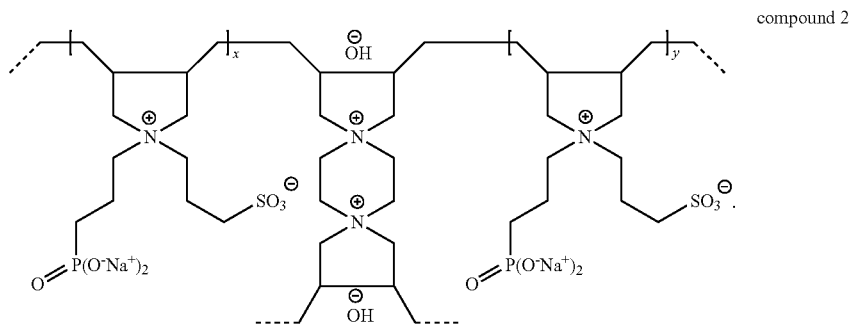

compound 2

In one embodiment, each $R_1$ is —H and the cyclopolymeric resin is polyzwitterionic or each $R_1$ is a positive counter ion and the cyclopolymeric resin is polyzwitterionic and dianionic.

According to a second aspect, the present disclosure relates to a process for producing the cross-linked cyclopolymeric resin comprising i) reacting a sultone with an esterified (diallylamino)alkylphosphonate followed by ester hydrolysis to form a N,N-diallyl quaternary ammonium monomer, ii) reacting an allyl halide with a piperazine-based compound to form a tetraallylpiperazinium cross-linking monomer, iii) cyclocopolymerizing the N,N-diallyl quaternary ammonium monomer and the tetraallylpiperazinium cross-linking monomer with a free radical initiator in a solvent to form a polyzwitterion cross-linked cyclopolymeric resin.

In one embodiment, the N,N-diallyl quaternary ammonium monomer has a structure of formula (II)

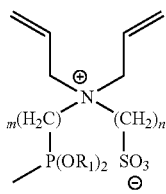

(II)

or a salt, solvate, tautomer or stereoisomer thereof wherein i) each $R_1$ is —H, a positive counter ion, an optionally substituted alkyl, an optionally substituted cycloalkyl, or an optionally substituted aryl and ii) m and n are independently a whole number in the range of 1-10.

In one embodiment, each $R_1$ is —H, m is 3, n is 3 and the N,N-diallyl quaternary ammonium monomer compound of formula (II) is

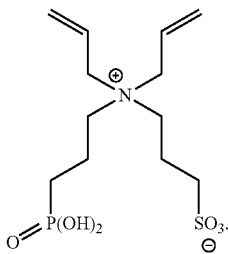

compound 3

In one embodiment, the molar ratio of the N,N-diallyl quaternary ammonium monomer to the tetraallylpiperazinium cross-linking monomer is greater than 8:1.

In one embodiment, the tetraallylpiperazinium cross-linking monomer has a structure of formula (III)

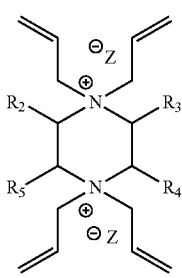

(III)

or a salt, solvate, tautomer or stereoisomer thereof wherein i) $R_2$, $R_3$, $R_4$, and $R_5$ are independently —H, an optionally substituted alkyl, an optionally substituted cycloalkyl, or an optionally substituted aryl and ii) Z is a counter ion.

In one embodiment, $R_2$ is —H, $R_3$ is —H, $R_4$ is —H, $R_5$ is —H, Z is Cl⁻ and the tetraallylpiperazinium cross-linking monomer compound of formula (III) is

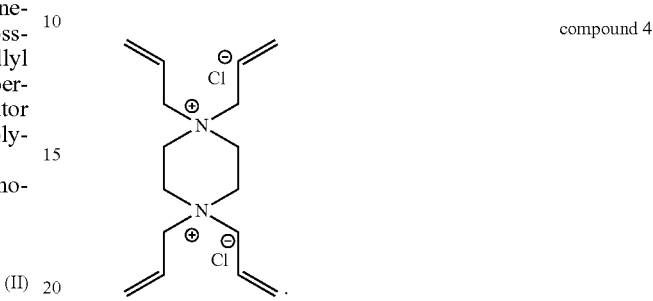

compound 4

In one embodiment, the free radical initiator is tert-butyl hydroperoxide (TBHP).

In one embodiment, the cyclocopolymerizing is performed at a temperature of up to 100° C. for a period of up to 24 hours.

In one embodiment, the process further comprises treating the polyzwitterion cross-linked cyclocopolymeric resin after cyclocopolymerizing with a base to form a polyzwitterion/dianion cross-linked cyclocopolymeric resin.

According to a third aspect, the present disclosure relates to a method for removing heavy metals from an aqueous solution, comprising i) contacting the cross-linked cyclopolymeric resin with an aqueous solution comprising at least one heavy metal and ii) adsorbing the heavy metal onto the cross-linked cyclopolymeric resin to form a heavy metal loaded cross-linked cyclopolymeric resin.

In one embodiment, the method further comprises i) desorbing the heavy metal from the heavy metal loaded cross-linked cyclopolymeric resin to reform the cross-linked cyclopolymeric resin and ii) reusing the cross-linked cyclopolymeric resin up to 15 times without a loss in adsorption capacity.

In one embodiment, the heavy metal is Ni (II).

In one embodiment, the cross-linked cyclopolymeric resin has an adsorption capacity of at least 30 mg of heavy metal per g of the cross-linked cyclopolymeric resin.

In one embodiment, the cross-linked cyclopolymeric resin is contacted with the aqueous solution at a concentration of 0.02-5.0 grams per liter of the aqueous solution at an aqueous solution pH range of 2-9.

In one embodiment, the method further comprises agitating the aqueous solution at a speed of up to 200 rpm.

In one embodiment, up to 90% of the total mass of the heavy metal is removed from the aqueous solution.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
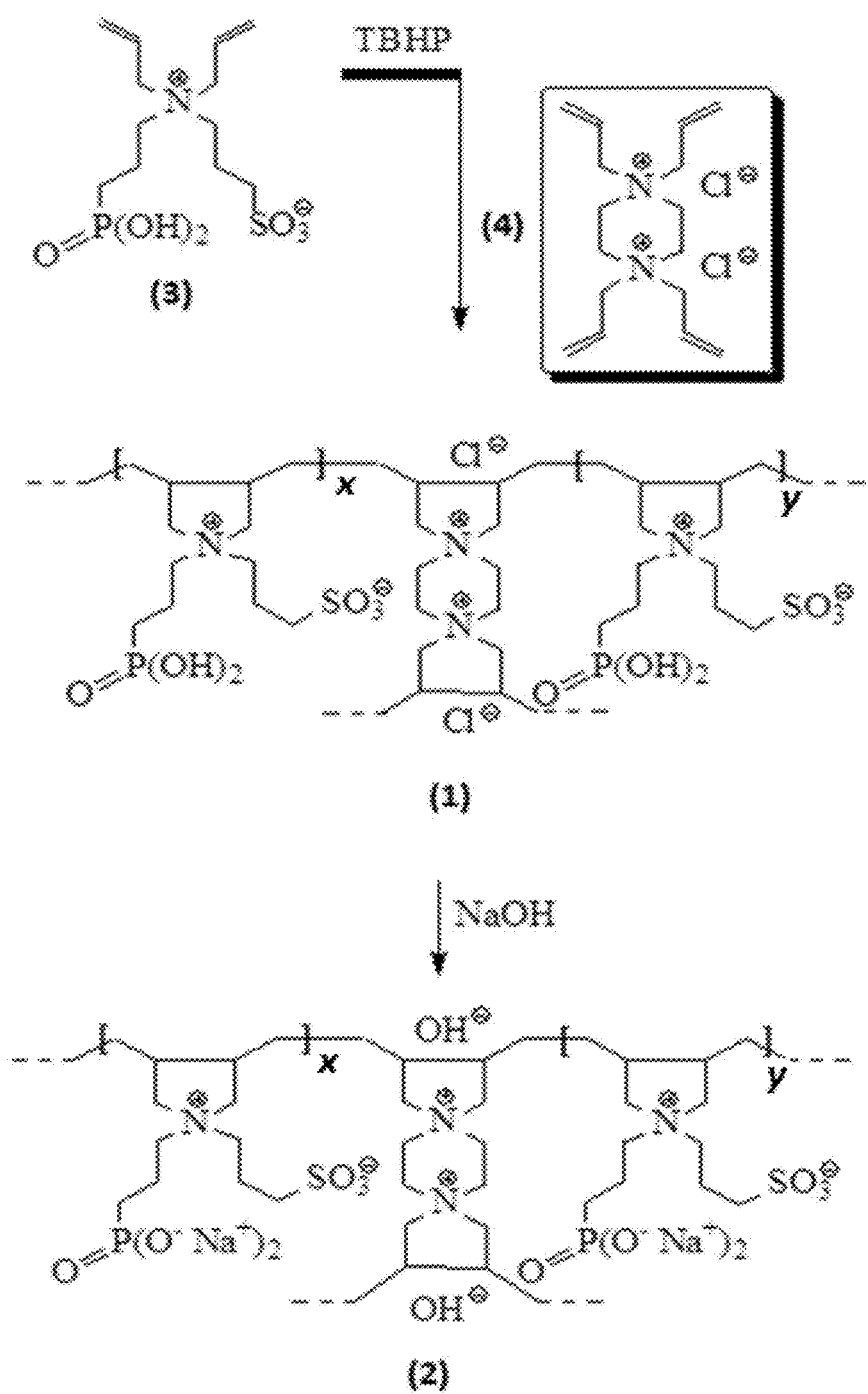
FIG. 1 is a synthetic scheme for the production of cross-linked cyclopolymeric resin of formula (I), compound 1 and compound 2, from cyclocopolymerization of a N,N-diallyl quaternary ammonium monomer compound 3 and a tetraallylpiperazinium cross-linking monomer compound 4.

Referring now to the drawings. Embodiments of the present disclosure will now be described more fully hereinafter with reference to the accompanying drawings, in which some, but not all of the embodiments of the disclosure are shown. The present disclosure will be better understood with reference to the following definitions.

As used herein a "polymer" refers to a large molecule, or macromolecule, of many repeating subunits and/or substances composed of macromolecules. As used herein a "monomer" refers to a molecule or compound that may bind chemically to other molecules to form a polymer. As used herein the term "repeat unit" or "repeating unit" refers to a part of the polymer or resin whose repetition would produce the complete polymer chain (excluding the end groups) by linking the repeat units together successively along the chain. The process by which monomers combine end to end to form a polymer is referred to herein as "polymerization", monomers are molecules which can undergo polymerization, thereby contributing constitutional repeating units to the essential structures of a macromolecule or polymer. As used herein, a "resin" refers to a solid or highly viscous substance or polymeric macromolecule containing polymers, preferably with reactive groups. As used herein a "copolymer" refers to a polymer derived from more than one species of monomer and are obtained by the "copolymerization" of more than one species of monomer. Copolymers obtained by copolymerization of two monomer species may be termed bipolymers, those obtained from three monomers may be termed terpolymers and those obtained from four monomers may be termed quaterpolymers, etc. As used herein a "cyclopolymer" refers to a polymer having cyclic structures in the main polymer chain (i.e. the polymer backbone) and are obtained by the "cyclopolymerization" of appropriate monomers where one or more cyclic or ring structures, heterocyclic or homocyclic, are formed. In many cases, the cyclic structures may be formed during the cyclopolymerization which may proceed by an alternating intra-intermolecular chain mechanism for polymerization. As used herein a "cyclocopolymer" refers to a polymer sharing the definition of a copolymer and a cyclopolymer and may be formed by "cyclocopolymerization". As used herein, "cross-linking" or a "cross-link" refers to polymers and resins containing branches that connect polymer chains via bonds that link one polymer chain to another. The cross-link may be an atom, a group of atoms, or a number of branch points connected by bonds, groups of atoms, or polymer chains. In the majority of cases, a cross-link is a covalent structure or covalent bond but the term may also describe sites of weaker chemical interactions, portions crystallites, and even physical interactions and entanglements. The cross-linking can alter the physical and mechanical properties of the polymer. Cross-linking may be formed by chemical reactions that are initiated by heat, pressure, change in pH, and/or radiation, with or without the presence of a cross-linking agent and/or catalyst.

As used herein, the terms "compound" and "complex" refer to a chemical entity, whether in the solid, liquid or gaseous phase, as well as in a crude mixture or purified and isolated form. The chemical transformations and/or reactions described herein are envisaged to proceed via standard laboratory and experimental techniques in regard to performing the reaction as well as standard purification, isolation and characterization protocols known to those skilled in the art.

As used herein, the term "salts" refers to derivatives of the disclosed compounds, monomers or polymers wherein the parent compound is modified by making acid or base salts thereof. Exemplary salts include, but are not limited to, mineral or organic acid salts of basic groups such as amines, and alkali or organic salts of acidic groups such as carboxylic acids. The salts include, but are not limited to, the conventional non-toxic salts or the quaternary ammonium salts of the parent compound formed, for example, from non-toxic inorganic or organic acids. Exemplary conventional non-toxic salts include those derived from inorganic acids including, but not limited to, hydrochloric, hydrobromic, sulfuric, sulfamic, phosphoric, and nitric; and those derived from organic acids including, but not limited to, acetic, propionic, succinic, glycolic, stearic, lactic, malic, tartaric, citric, ascorbic, pamoic, maleic, hydroxymaleic, phenylacetic, glutamic, benzoic, salicylic, sulfanilic, 2-acetoxybenzoic, fumaric, toluenesulfonic, methanesulfonic, ethane disulfonic, oxalic, isethionic and mixtures thereof and the like. Further, salts of carboxylic acid containing compounds may include cations such as lithium, sodium, potassium, magnesium, quaternary ammonium, and the like. The salts of the present disclosure can be synthesized from the parent compound that contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally non-aqueous media like ether, ethyl acetate, ethanol, isopropanol, or acetonitrile are preferred.

As used herein, the term "solvate" refers to a physical association of a compound, monomer or polymer of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvates include, but are not limited to, hydrates, ethanolates, methanolates, isopropanolates and mixtures thereof. Methods of solvation are generally known to those skilled in the art.

As used herein, the term "tautomer" refers to constitutional isomers of organic compounds that readily convert by the chemical reaction of tautomerization or tautomerism. The reaction commonly results in the formal migration of a hydrogen atom or proton, accompanied by a switch of a single bond and adjacent double bond. Tautomerism is a special case of structural isomerism and because of the rapid interconversion; tautomers are generally considered to be the same chemical compound. In solutions in which tautomerization is possible, a chemical equilibrium of the tautomers will be reached. The exact ratio of the tautomers depends on several factors including, but not limited to, temperature, solvent and pH. Exemplary common tautomeric pairs include, but are not limited to, ketone and enol, enamine and imine, ketene and ynol, nitroso and oxime, amide and imidic acid, lactam and lactim (an amide and imidic acid tautomerism in heterocyclic rings), enamine and enamine and anomers of reducing sugars.

Prototropy or prototropic tautomerism refers to the relocation of a proton. Prototropy may be considered a subset of acid base behavior. Prototropic tautomers are sets of isomeric protonation states with the same empirical formula and total charge. Tautomerizations may be catalyzed by bases (deprotonation, formation of an enolate or delocalized anion, and protonation at a different position of the anion) and/or acids (protonation, formation of a delocalized cation and deprotonation at a different position adjacent to the cation). Two additional subcategories of tautomerization include annular tautomerism, wherein a proton can occupy two or more positions of a heterocyclic system, and ring-chain tautomerism, wherein the movement of a proton is accompanied by a change from an open structure to a ring. Valence tautomerism is a type of tautomerism in which single and/or double bonds are rapidly formed and ruptured, without migration of atoms or groups. It is distinct from prototropic tautomeism, and involves processes with rapid reorganization of bonding electrons, such as open and closed forms of certain heterocycles, such as azide-tetrazole or mesoionic munchnone-acylamino ketene. Valence tautomerism requires a change in molecular geometry unlike canonical resonance structures or mesomers. In terms of the present disclosure, the tautomerism may refer to prototropic tautomerism, annular tautomerism, ring-chain tautomerism, valence tautomerism, or mixtures thereof.

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection or their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which thy rotate polarized light and how they interact with different optical isomers of other compounds. Diastereomers and stereoisomers not related through a reflection operation, they are not mirror images of each other. These include meso compounds, cis- and trans-(E- and Z-)isomers, and non-enantiomeric optical isomers. Diastereomers seldom have the same physical properties. In terms of the present disclosure, stereoisomers may refer to enantiomers, diastereomers or both.

Conformers (rotamers), or conformational isomerism refers to a form of isomerism that describes the phenomenon of molecules with the same structural formula but with different shapes due to rotations about one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the double bonds, ring systems, stereogenic centers, and the like can all be present in the compounds, and all such stable isomers are contemplated in the present disclosure. Cis- and trans-(or E- and Z-)stereoisomers of the compounds of the present disclosure wherein rotation about the double bond is restricted, keeping the substituents fixed relative to each other, are described and may be isolated as a mixture of isomers or as separated isomeric forms. S- and R-(or L- and D-)stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example by chromatography, fractional crystallization, or use of a chiral agent.

The present disclosure is further intended to include all isotopes of atoms occurring in the present compounds. Isotopes include those atoms having the same atomic number but different mass numbers. By way of general example, and without limitation, isotopes of hydrogen include deuterium and tritium. Isotopes of carbon include $^{13}$C and $^{14}$C. Isotopically labeled compounds of the invention can generally be prepared by conventional techniques known to those skilled in the art or by processes and methods analogous to those described herein, using an appropriate isotopically labeled reagent in place of the non-labeled reagent otherwise employed.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from the exemplary group including, but not limited to, halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —SO$_2$NH$_2$), substituted sulfonamide, nitro, cyano, carboxy, carbamyl (e.g. —CONH$_2$), substituted carbamyl (e.g. —CONHalkyl, —CONHaryl, —CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof and the like.

As used herein, the term "alkyl" unless otherwise specified, refers to both branched and straight chain saturated aliphatic primary, secondary, and/or tertiary hydrocarbons of typically C$_1$ to C$_{10}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. As used herein, the term optionally includes substituted alkyl groups. Exemplary moieties with which the alkyl group can be substituted may be selected from the group including, but not limited to, hydroxyl, amino, alkylamino, arylamino, alkoxy, aryloxy, nitro, cyano, sulfonic acid, sulfate, phosphonic acid, phosphate, or phosphonate or mixtures thereof. The substituted moiety may be either protected or unprotected as necessary, and as known to those skilled in the art.

As used herein, the term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

As used herein, the term "aryl" unless otherwise specified refers to functional groups or substituents derived from an aromatic ring including, but not limited to, phenyl, biphenyl, napthyl, thienyl, and indolyl. As used herein, the term optionally includes both substituted and unsubstituted moieties. Exemplary moieties with which the aryl group can be substituted may be selected from the group including, but not limited to, hydroxyl, amino, alkylamino, arylamino, alkoxy, aryloxy, nitro, cyano, sulfonic acid, sulfate, phosphonic acid, phosphate or phosphonate or mixtures thereof. The substituted moiety may be either protected or unprotected as necessary, and as known to those skilled in the art.

According to a first aspect, the present disclosure relates to a cross-linked cyclopolymeric resin of formula (I)

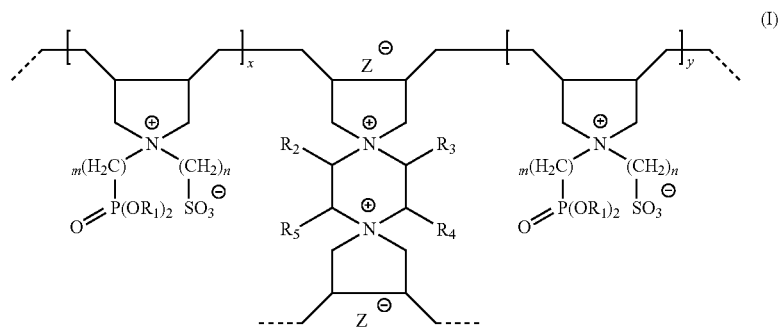

or a salt, solvate, tautomer or stereoisomer thereof wherein i) each $R_1$ is —H, a positive counter ion, an optionally substituted alkyl, optionally substituted cycloalkyl, or optionally substituted aryl, ii) $R_2$, $R_3$, $R_4$, and $R_5$ are independently —H, an optionally substituted alkyl, optionally substituted cycloalkyl, or optionally substituted aryl, iii) m and n are independently a whole number in the range of 1-10, iv) x and y are independently a whole number greater than zero, and v) Z is a counter ion.

In a preferred embodiment, each $R_1$ is —H, a positive counter ion, an optionally substituted alkyl, optionally substituted cycloalkyl or optionally substituted aryl, most preferably each $R_1$ is —H or a positive counter ion, most preferably each R1 is —H, Li$^+$, Na$^+$, K$^+$ or other suitable monocations, preferably —H or Na$^+$. In a preferred embodiment, $R_2$, $R_3$, $R_4$, and $R_5$ are independently —H, an optionally substituted alkyl, optionally substituted cycloalkyl, or optionally substituted aryl, most preferably $R_2$, $R_3$, $R_4$, and $R_5$ are independently —H or an optionally substituted C$_1$-C$_6$ alkyl group, preferably a —H, a methyl group or an optionally substituted ethyl group, most preferably —H. In another embodiment, $R_2$, $R_3$, $R_4$, and $R_5$ are independently —H or a halide, most preferably —H. In a preferred embodiment, m and n are independently a whole number in the range of 1-10, preferably 1-8, preferably 2-5, preferably 2-4, most preferably 3. In one embodiment, the value of m and n denote a straight alkyl chain of CH$_2$ groups, and it is equally envisaged that this alkyl chain moiety may be optionally substituted as described herein. In a preferred embodiment, x is a whole number greater than zero, preferably x is 1-5000, preferably 1-2500, preferably 1-1000, preferably 1-500, preferably 2-400, preferably 3-300, preferably 4-275, preferably 5-250, preferably 10-200, preferably 15-150, preferably 20-100, preferably 25-50. In a preferred embodiment, y is a whole number greater than zero, preferably y is 1-5000, preferably 1-2500, preferably 1-1000, preferably 1-500, preferably 1-400, preferably 1-300, preferably 1-275, preferably 5-250, preferably 10-200, preferably 15-150, preferably 20-100, preferably 25-50. In a preferred embodiment, Z is a counter ion, preferably $F^-$, $Cl^-$, $Br^-$, $I^-$, $NO_3^-$, $OH^-$ or other suitable monoanion, preferably Z is $OH^-$ or a halide, most preferably $Cl^-$. In another embodiment, it is equally envisaged that the pyrrolidine ring moiety of the cyclopolymer of formula (I) may be optionally substituted as described herein.

The repeating unit x, the repeating unit y, or both the repeating unit x and y may be repeated in the cyclopolymer of formula (I) from 10-10000 times, preferably 20 to 5000 times, more preferably 25 to 2500 times, more preferably 50 to 1500 times, more preferably 100 to 1000 times. It is equally envisaged that values for x, y, or both may fall outside of these ranges and still provide suitable cyclopolymer of formula (I) material.

In one embodiment, each $R_1$ is —H, $R_2$ is —H, $R_3$ is —H, $R_4$ is —H, $R_5$ is —H, m is 3, n is 3, x and y are independently a whole number greater than zero and Z is $Cl^-$ and the cross-linked cyclopolymeric resin of formula (I) is

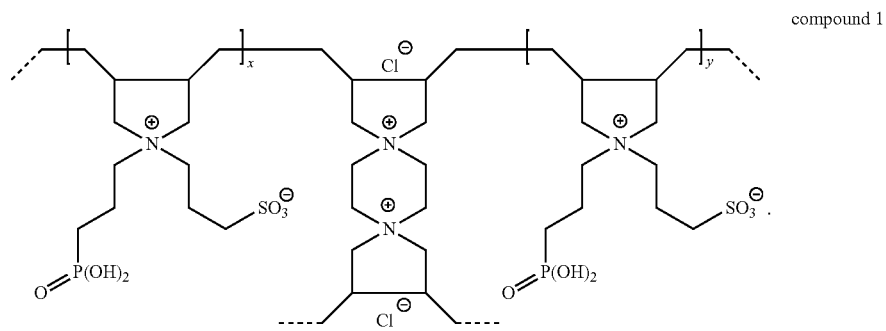

compound 1 wherein x and y are independently whole numbers greater than zero, preferably 1-5000, preferably 1-2500, preferably 1-1000, preferably 1-500, preferably 2-400, preferably 3-300, preferably 4-275, preferably 5-250, preferably 10-200, preferably 15-150, preferably 20-100, preferably 25-50.

In one embodiment, each $R_1$ is $Na^+$, $R_2$ is —H, $R_3$ is —H, $R_4$ is —H, $R_5$ is —H, m is 3, n is 3, x and y are independently a whole number greater than zero and Z is $OH^-$ and the cross-linked cyclopolymeric resin of formula (I) is

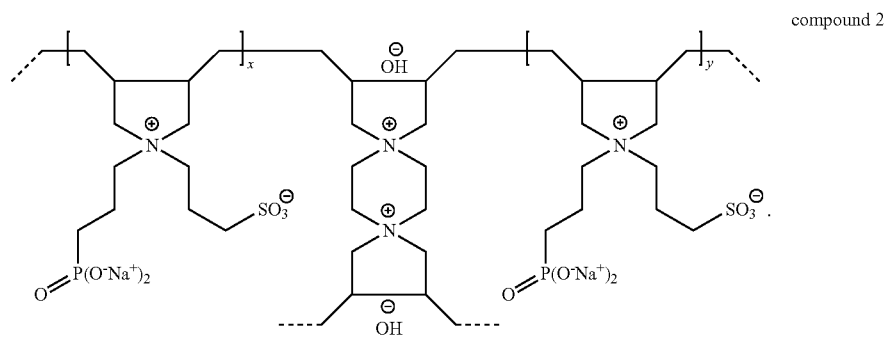

compound 2 wherein x and y are independently whole numbers greater than zero, preferably 1-5000, preferably 1-2500, preferably 1-1000, preferably 1-500, preferably 2-400, preferably 3-300, preferably 4-275, preferably 5-250, preferably 10-200, preferably 15-150, preferably 20-100, preferably 25-50.

The present disclosure provides cyclopolymers, preferably copolymers and/or bipolymers where one or more of the monomers constituting the copolymer each contain one or more quaternary nitrogen atoms or quaternary ammonium cations. As used herein, "quaternary ammonium salt", which also refers to a "quaternary ammonium compound" and/or a "quaternary amine", refers to a salt having one or more quaternary ammonium cations with an anion. Quaternary ammonium cations are positively charged polyatomic ions with a generic formula $NQ_4^+$, with Q being the same or different alkyl or aryl groups. These quaternary ammonium salt monomers are preferably neutral and zwitterionic, where positive and negative electrical charges are present in each monomeric molecule at equal amounts. In a preferred embodiment, the copolymer has a least one quaternary ammonium salt monomer that possesses phosphor- and sulfo-pendents. The cross-linked cyclopolymeric resin, formed by cyclocopolymerization of the different monomers, can exist in an acidic form or a basic form, preferably the cross-linked cyclopolymeric resin is in a basic form. In a preferred embodiment, each $R_1$ is —H and the cross-linked cyclopolymeric resin of the present disclosure is polyzwitterionic. In another preferred embodiment, each $R_1$ is a positive counter ion, preferably $Na^+$, and the cross-linked cyclopolymeric resin of the present disclosure is polyzwitterionic and dianionic.

In a preferred embodiment, at least one of the quaternary ammonium salt monomers is a cross-linking agent for the copolymer. As used herein, "cross-linking" refers to polymers and resins containing branches that connect polymer chains via covalent bonds. The cross-linking can alter the physical and mechanical properties of the polymer. Cross-linking may be formed by chemical reactions that are initiated by heat, pressure, change in pH, and/or radiation, with or without the presence of a cross-linking agent and/or catalyst. In a preferred embodiment, one of the monomers acts as a cross-linking agent and is therefore a cross-linking monomer. In a preferred embodiment, the cross-linking monomer is the quaternary ammonium salt monomer represented by formula (III), preferably a tetrallylpiperazinium cross-linking monomer. In a preferred embodiment, each polymer chain of the cross-linked cyclopolymeric resin described herein comprises 5-10% of the monomer represented by formula (III) based on the total number of monomers represented by formula (II) and formula (III), preferably 5-8%, more preferably 6-8%, or 7%.

In a preferred embodiment, monomers of the copolymer or cyclocopolymer include, but are not limited to, a N,N-diallyl quaternary ammonium monomer and a tetrallylpiperazinium cross-linking monomer, preferably 3-(diallyl(3-phosphonopropyl) ammonio) propane-1-sulfonate (compound 3) and 1,1,4,4-tetraallylpipperazinium dichloride (compound 4). In another embodiment, it is equally envisaged that the cyclopolymer of the present disclosure, in addition to the monomer of formula (II) and cross-linking monomer of formula (III) may further comprise at least one selected from the group including, but not limited to, a monomer having a mono-, di-, tri- or tetrallyl group, a monomer having one or more sulfoxide or sulfone functional groups, a monomer containing one or more quaternary or tertiary nitrogen atoms that are optionally part of a 3- to 8-membered heterocyclic ring, nitrogen dioxide, nitrogen disulfide, sulfur dioxide, carbon dioxide, carbon disulfide and mixtures thereof.

Since a copolymer consists of at least two types of constituent units (structural units), copolymers can be classified based on how these units are arranged along the chain. Alternating copolymers are copolymers consisting of macromolecules comprising two species of monomeric units in a regular alternating sequence. An alternating copolymer may be considered as a homopolymer derived from an implicit or hypothetical monomer. A periodic copolymer is a copolymer which has two species of monomeric units arranged in a repeating sequence. A statistical copolymer is a copolymer in which the sequence of monomeric units follows a statistical rule. Alternatively if the probability of finding a specific monomeric unit at a particular point in the chain is equal to the mole fraction of that monomeric unit in the chain, then the polymer may be referred to as a truly random copolymer. In gradient copolymers the monomer composition changes gradually along the chain. The cross-linked cyclopolymeric resin of the present disclosure may be an alternating copolymer, a periodic copolymer, a statistical copolymer a random copolymer or mixtures thereof.

Copolymers may also be described in terms of the existence of or arrangement of branches in the polymer structure. Linear copolymers consist of a single main chain whereas branched copolymers consist of a single main chain with one or more polymeric side chains. The cross-linked cyclopolymeric resin of the present disclosure may be a linear copolymer, a branched copolymer, other special types of branched copolymers including star copolymers, brush copolymers and comb copolymers and mixtures thereof.

A block copolymer is a specific type of copolymer made up of blocks of different polymerized monomers. In a block copolymer, a portion of the macromolecule comprising many constitutional units has at least one feature which is not present in the adjacent portions. Block copolymers comprise two or more homopolymer subunits linked by covalent bonds. The union of the homopolymer subunits may require an intermediate non-repeating subunit, known as a junction block. Block copolymers with two or three distinct blocks are called diblock copolymers and triblock copolymers respectively, tetrablocks and multiblocks, etc. can also be fabricated. In stereoblock copolymers a special structure can be formed from one monomer where the distinguishing feature is the tacticity of each block. The cross-linked cyclopolymeric resin of the present disclosure may be a block copolymer, a stereoblock copolymer or mixtures thereof.

A graft macromolecule refers to a macromolecule with one or more species of block connected to the main chain as side chains, these side chains having constitutional or configurational features that differ from those in the main chain. Graft copolymers are a specific type of branched copolymer in which the side chains are structurally distinct from the main chain. For example, the main chain and side chains may be composed of distinct homopolymers; however, the individual chains of a graft copolymer may be homopolymers or copolymers. Different copolymer sequencing is sufficient to define a structural difference, thus a diblock copolymer with alternating copolymer side chains may be termed a graft copolymer. As with block copolymers, the quasi-composite graft copolymer product has properties of both "components". The cross-linked cyclopolymeric resin of the present disclosure may be a graft copolymer.

Polymers can be classified based on their tacticity or structure. Tacticity may be defined as the geometric arrangement (orientation) of the characteristic group (side group or side chain) of monomer units or repeating units with respect to the main chain (backbone) of the polymer. An isotactic polymer is the type of polymer in which the characteristic groups are arranged on the same side of the main chain. A syndiotactic polymer is the type of polymer in which the characteristic groups are arranged in an alternating fashion. An atactic polymer is the type of polymer in which the characteristic groups are arranged in irregular fashion (randomness) around the main chain. The cross-linked cyclopolymeric resin of the present disclosure may be isotactic, syndiotactic, atactic or copolymers and mixtures thereof.

The degree of polymerization (DP) is defined as the number of monomeric units in a macromolecule or polymer. In one embodiment, the cross-linked cyclopolymeric resin of the present disclosure has a degree of polymerization of 100-2500, preferably 100-1500, preferably 100-750, preferably 100-300. In a preferred embodiment, the cross-linked cyclopolymeric resin of the present disclosure is produced by free radical polymerization which often results in a wide molecular weight distribution. In one embodiment, the cross-linked cyclopolymeric resin of the present disclosure has an average molecular weight of 5-200 kDa, preferably 10-150 kDa, preferably 10-100 kDa, preferably 10-75 kDa, more preferably 10-50 kDa, preferably 20-35 kDa.

Dispersity is a measure of the heterogeneity of sizes of molecules or particles in a mixture. The polydispersity index (PDI or heterogeneity index) is a measure of the distribution of molecular mass in a given polymer sample. The PDI is calculated as the weight average molecular weight divided by the number average molecular weight. Typically, dispersities vary based on the mechanism of polymerization and can be affected by a variety of reaction conditions such as reactant ratios, how close the polymerization went to completion, etc. Generally, a decreasing molecular weight distribution increases water solubility and increases flexibility; it can further affect properties including crystalizability, adhesion, mechanical strength and diffusivity. In one embodiment, the cross-linked cyclopolymeric resin of the present disclosure has a PDI of at least 1 and up to 6, preferably up to 5, preferably up to 3, preferably up to 2.5, preferably up to 2, preferably up to 1.5, preferably up to 1.25.

In general, polymeric mixtures are far less miscible than mixtures of small molecules. This is a result of the driving force for mixing usually being entropy, rather than interaction energy. Miscible materials generally form a solution not because their interaction with each other is more favorable than their self-interaction, but because of an increase in entropy and hence free energy associated with increasing the amount of volume available to each component. This tends to increase the free energy of mixing for much larger polymeric molecules in polymer solutions and thus makes solvation less favorable. In dilute solution, the properties of the polymer are characterized by the interaction between the solvent and the polymer. In a good solvent, the polymer appears swollen and occupies a large volume, the intermolecular forces between the solvent and monomer subunits dominate over intramolecular interactions. In a bad solvent or poor solvent, intramolecular forces dominate and the chain contracts.

Cross-linking is often measured by swelling experiments. In one embodiment, the cross-linked sample is placed into a good solvent at a specific temperature, and either the change in mass or the change in volume is measure. The more cross-linking, the less swelling is attainable. Based on the degree of swelling, the Flory interaction parameter (which relates the solvent interaction with the sample), and the density of the solvent, the theoretical degree of cross-linking can be calculated according to Flory's network theory. Two ASTM standards are commonly used to describe the degree of cross-linking in polymeric resins. In ASTM D2765, the sample is weighed, and then placed in a solvent for 24 hours, weighed again while swollen, then dried and weighed a final time. The degree of swelling and the soluble portion can be calculated. In another ASTM standard, F2214, the sample is placed in an instrument that measures the height change in the sample, allowing the user to measure the volume change and the cross-link density can then be calculated.

According to a second aspect, the present disclosure relates to a process for producing the cross-linked cyclopolymeric resin of formula (I) described herein in any of its embodiments.

In one step a sultone is reacted with an esterified (diallylamino)alkylphosphonate followed by ester hydrolysis to form a N,N-diallyl quaternary ammonium monomer. Cyclic sulfonic esters are called sultones, some sultones are short-lived intermediates, used as strong alkylating agents to introduce a negatively charged sulfonate group. In a preferred embodiment, the sultone is 1,3-propane sultone an organosulfur compound with the formula $(CH2)_3SO_3$. The cyclic sulfonate ester, as is typical of activated esters, is an alkylating agent that readily hydrolyzes to the hydroxysulfonic acid. Alkylation refers to the transfer of an alkyl group from one molecule to another. The alkyl group may be transferred as an alkyl carbocation, a free radical or a carbene (or their equivalents). Alkylating agents add a desired aliphatic carbon chain to a staring molecule. In a preferred embodiment, the esterified (diallylamino)alkylphosphonate is alkylated by the sultone (i.e. the sultone is the alkylating agent). In a preferred embodiment, the esterified (diallyamino)alkylphosphonate is diethyl 3-(diallylamino)propylphosphonate or dimethyl 3-(diallylamino)propylphosphonate, most preferably diethyl 3-(diallylamino)propylphosphonate.

In a preferred embodiment, the alkylation is performed under an inert environment (i.e. under $N_2$ or Ar gas, preferably $N_2$) in a polar aprotic solvent selected from the exemplary group including, but no limited to, tetrahydrofuran, ethyl acetate, acetone, dimethylformamide, acetonitrile, dimethyl sulfoxide, nitromethane and propylene carbonate, most preferably acetonitrile. It is equally envisaged that the reaction may be adapted to be performed in a polar protic solvent, a nonpolar solvent or mixtures thereof. In a preferred embodiment the alkylation is performed at a temperature in the range of 50-150° C., preferably 60-140° C., preferably 70-120° C., preferably 80-110° C., preferably 90-100° C., or 95° C. and has a stirred reaction time of up to 48 hr, preferably 12-48 hr, preferably 16-36 hr, preferably 20-30 hr, preferably 20-24 hr, or 22 hr. In a preferred embodiment, the alkylation has a yield of greater than 40%, preferably greater than 50%, preferably greater than 60%, more preferably greater than 65%, most preferably greater than 70%.

Esters react with nucleophiles at the carbonyl carbon. Esterification is a reversible reaction. Esters undergo hydrolysis under acidic and basic conditions. Under acidic conditions, the reaction is the reverse reaction of the Fischer esterification. Under basic conditions, hydroxide acts as a nucleophile while an alkoxide is the leaving group. In a preferred embodiment, the ester hydrolysis to form the N,N-diallyl quaternary ammonium monomer is performed under acidic conditions. In a preferred embodiment, the acid is at least one selected from the group consisting of mineral acids (inorganic acids), sulfonic acids (RS(=O)$_2$—OH), carboxylic acids (R—C(O)OH), halogenated carboxylic acids and mixtures thereof, preferably a carboxylic acid or mineral acid, most preferably a mineral acid or hydrochloric acid (HCl) or dry hydrochloric acid. Exemplary carboxylic acids include, but are not limited to acetic acid, citric acid and formic acid. Exemplary mineral acids include, but are not limited to, hydrogen halides and their solutions (hydrofluoric acid, hydrochloric acid, hydrobromic acid, hydroiodic acid), halogen oxoacids (hypochlorous acid, chlorous acid, chloric acid, perchloric acid and corresponding bromine and iodine compounds), sulfuric acid, nitric acid, phosphoric acid, boric acid and the like. In a preferred embodiment, the ester hydrolysis is performed in a polar protic solvent, most preferably water at a temperature of at a temperature of up to 100° C., preferably 0-100° C., preferably 20-100° C., preferably 40-98° C., preferably 60-98° C., preferably 80-95° C., preferably 90-95° C. or 95° C. and has a stirred reaction time of up to 36 hr, preferably 2-36 hr, preferably 4-36 hr, preferably 10-30 hr, preferably 12-28 hr, preferably 18-26 hr, preferably 20-25 hr or 24 hr. In a preferred embodiment, the ester hydrolysis has a yield of greater than 70%, preferably greater than 75%, preferably greater than 80%, more preferably greater than 85%, more preferably greater than 90%, most preferably greater than 95%.

In one embodiment, the N,N-diallyl quaternary ammonium monomer has a structure of formula (II)

(II)

or a salt, solvate, tautomer or stereoisomer thereof wherein i) each $R_1$ is —H, a positive counter ion, an optionally substituted alkyl, optionally substituted cycloalkyl, or optionally substituted aryl and ii) m and n are independently a whole number in the range of 1-10. In a preferred embodiment, each $R_1$ is —H, a positive counter ion, an optionally substituted alkyl, optionally substituted cycloalkyl or optionally substituted aryl, preferably each $R_1$ is independently —H or an optionally substituted $C_1$-$C_6$ alkyl group, preferably independently a —H, a methyl group or an optionally substituted ethyl group, most preferably —H, most preferably each $R_1$ is —H or a positive counter ion. In a preferred embodiment, m and n are independently a whole number in the range of 1-10, preferably 1-8, preferably 2-5, preferably 2-4, most preferably 3. In one embodiment, the value of m and n denote a straight alkyl chain of $CH_2$ groups, it is equally envisaged that this alkyl chain moiety may be optionally substituted as described herein.

In one embodiment, each $R_1$ is —H, m is 3, n is 3 and the N,N-diallyl quaternary ammonium monomer compound of formula (II) is 3-(diallyl(3-phosphonopropyl)ammonio) propane-1-sulfonate or

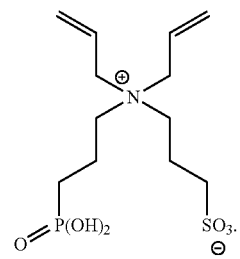

compound 3

In one step of the process a piperazine-based compound is reacted with an allyl halide to form a tetraallylpiperazinium crosslinking monomer. In a preferred embodiment, the reaction is an allylation, a chemical reaction that adds an allyl group to a substrate; preferably the reaction is at least a diallylation, a chemical reaction that adds two allyl groups, most preferably the reaction is a tetraallylation, a chemical reaction that adds four allyl groups to a substrate, most preferably a N,N-tetraallylation. In a preferred embodiment the piperazine-based compound has the general structure of piperazine although the ring may be optionally substituted as described herein. In a preferred embodiment, the allyl halide is one selected from the exemplary group including, but not limited to, allyl bromide, allyl chloride, allyl iodide, allyl triflate, preferably allyl chloride. In a preferred embodiment, the allylation reaction is performed in the presence of a base. The base may be a strong base (i.e. lithium hydroxide, sodium hydroxide, potassium hydroxide, etc.) or a weak base (i.e. potassium carbonate, ammonium hydroxide, sodium carbonate, calcium carbonate, sodium sulfate), preferably a weak base, most preferably potassium carbonate.

In a preferred embodiment, the allylation reaction is performed in a polar aprotic solvent selected from the exemplary group including, but not limited to, tetrahydrofuran, ethyl acetate, acetone, dimethyl formamide, acetonitrile, dimethyl sulfoxide, nitromethane, most preferably acetonitrile. It is equally envisaged that the allylation reaction may be adapted to be performed in a non-polar solvent, a polar protic solvent or mixtures thereof. In a preferred embodiment, the allylation reaction is performed under an inert environment (i.e. under $N_2$ or Ar gas, preferably $N_2$). In a preferred embodiment, the allylation reaction is performed at a temperature of 0-80° C., preferably 20-75° C., preferably 30-70° C., preferably 40-65° C., preferably 45-60° C. or 50° C. and has a stirred reaction time of 2-48 hr, preferably 4-36 hr, preferably 8-30 hr, preferably 10-28 hr, preferably 12-24 hr, preferably 18-24 hr. In a preferred embodiment, the allylation reaction has a yield of greater than 50%, preferably greater than 60%, preferably greater than 70%, more preferably greater than 75%.

In one embodiment, the tetraallylpiperazinium cross-linking monomer has a structure of formula (III)

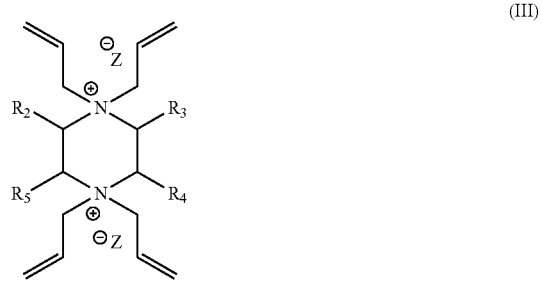

(III)

or a salt, solvate, tautomer or stereoisomer thereof wherein i) $R_2$, $R_3$, $R_4$, and $R_5$ are independently —H, an optionally substituted alkyl, optionally substituted cycloalkyl, or optionally substituted aryl, most preferably $R_2$, $R_3$, $R_4$, and $R_5$ are independently —H or an optionally substituted $C_1$-$C_6$ alkyl group, preferably a —H, a methyl group or an optionally substituted ethyl group, most preferably —H. In another embodiment, $R_2$, $R_3$, $R_4$, and $R_5$ are independently —H or a halide, most preferably $R_2$, $R_3$, $R_4$, and $R_5$ are independently —H and ii) Z is a counter ion, preferably Z is $F^-$, $Cl^-$, $Br^-$, $I^-$, $NO_3^-$, $OH^-$ or other suitable monoanion, preferably Z is a halide, most preferably $Cl^-$.

In one embodiment, $R_2$ is —H, $R_3$ is —H, $R_4$ is —H, $R_5$ is —H, Z is $Cl^-$ and the tetraallylpiperazinium cross-linking monomer compound of formula (III) is 1,1,4,4-tetraallylpipperazinium dichloride or

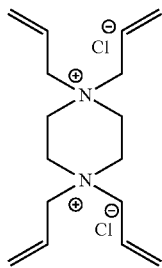

compound 4

In one step of the process, the N,N-diallyl quaternary ammonium monomer of formula (II) and the tetrallylpiperzinium cross-linking monomer of formula (III) are cyccopolymerized using a free radical initiator in a solvent to form a polyzwitterion cross-linked cyclopolymeric resin. The cyclocopolymerization protocols may be similar to those described in the literature with slight modifications as recognized as appropriate by a person of ordinary skill in the polymer chemistry art. In a preferred embodiment, the cyclocopolymerization is a Butler cyclopolymerization generally referring to polymerization of 1,6-dienes of diallyl quaternary ammonium salts to yield linear polymers containing rings along the linear chain and little or no residual unsaturation. The polymerization mechanism generally involves alternating intramolecular-intermolecular chain propagation. Thus, cyclopolymerization, as used herein, is any type of chain-growth addition polymerization that leads to introduction of cyclic structures into the main chain of the polymer. The reactions generally proceed under kinetic rather than thermodynamic control. Suitable monomers undergo cyclopolymerization by the use of appropriate initiators and well-known methods of radical initiation of polymerization.

As used herein a free radical initiator is a substance that can produce radical species under mild conditions and promote radical reactions. These substances generally possess weak bonds that have small bond dissociation energies and are often used in industrial processes such as polymer synthesis. Typical examples of radical initiators are halogen molecules, azo compounds and organic and inorganic peroxides. Halogens undergo the hemolytic fission relatively easily (i.e. chlorine gives to chlorine radicals (Cl.) by irradiation with ultraviolet light). Azo compounds (R—N═N—R') can be the precursor of two carbon centered radicals (R. and R'.) and nitrogen gas upon heating and/or by irradiation. Exemplary azo compound radical initiators include, but are not limited to, azobisisobutyronitrile (AIBN), 1,1'-azobis(cyclohexanecarbonitrile) (ABCN), 4,4'-azobis(4-cyanovaleric acid), 2,2'-azobis(2-methylpropionamidine) dihydrochloride, and 2,2'-azobis(2-methylpropionitrile). AIBN and ABCN yield isobutryonitrile and cyclohexanecarbonitrile radicals.

Organic peroxides each have a peroxide bond (—O—O—), which is readily cleaved to give two oxygen centered radicals. The oxyl radicals are unstable and believed to be transformed into relatively stable carbon centered radicals. Exemplary organic peroxide radical initiators include, but are not limited to, di-tert-butyl peroxide ($^t$BuOO$^t$Bu), benzoyl peroxide ((PhCOO)$_2$), methyl ethyl ketone peroxide, acetone peroxide, tert-butyl hydroperoxide, tert-butyl peracetate, cumene hydroperoxide, 2,5-Di(tert-butylperoxy)-2,5-dimethyl-3-hexyne, dicumyl peroxide, 2-butanone peroxide, tert-butyl peroxybenzoate, tert-butylperoxy 2-ethylhexyl carbonate, 2,5-bis(tert-butylperoxy)-2,5-dimethylhexane, lauroyl peroxide 1,1-bis(tert-butylperoxy)-3,3,5-trimethylcyclohexane, 2,4-pentanedione peroxide 1,1-bis(tert-butylperoxy)cyclohexane, and 1,1-bis(tert-amylperoxy)cyclohexane. Di-tert-butyl peroxide gives two t-butanoyl radicals ($^t$BuO.) and the radicals become methyl radicals (CH$_3$.) with the loss of acetone, benzoyl peroxide generates benzoyloxyl radicals (PhCOO.) each of which loses carbon dioxide to be converted into a phenyl radical (Ph.).

Inorganic peroxides function analogously to organic peroxides and many polymers are often produced from the alkenes upon initiation with peroxydisulfate salts. In solution, peroxydisulfate dissociates to give sulfate radicals (i.e. $[O_3SO—OSO_3]^{2-} \rightleftharpoons 2\,[SO_4]^-$). Exemplary inorganic peroxide radical initiators include, but are not limited to, ammonium persulfate, hydroxymethanesulfinic acid monosodium salt dihydrate, potassium persulfate and sodium persulfate. In terms of the present disclosure, the free radical initiator may be a halogen, an azo compound, an organic peroxide, and inorganic peroxide or mixtures thereof, preferably an azo compound or organic peroxide, most preferably an organic peroxide compound, preferably tert-butyl hydroperoxide (TBHP).

In a non-limiting example, the cyclocopolymerization can be synthesized by initially dissolving a N,N-diallyl quaternary ammonium monomer (compound of formula (II)) and the tetraallylpiperizinium cross-linking monomer (compound of formula (III)) in solvent to form a reaction solution. The tetraallylpipeprizinium cross-linking monomer is added to the reaction solution such that the polymer solution contains the N,N-diallyl quaternary ammonium monomer and the tetraallylpiperizinium cross-linking monomer in a molar ratio of greater than 8:1, preferably greater than 10:1, preferably 10:1 to 20:1, preferably 10:1 to 15:1, preferably 12:1 to 14:1. In a preferred embodiment, the cyclocopolymerization is performed in a polar protic solvent including, but not limited to, formic acid, n-butanol, isopropanol, ethanol, methanol, acetic acid, and water or mixtures thereof. It is equally envisaged that the cyclocopolymerization may be adapted to be performed in a polar aprotic solvent or a non-polar solvent. In a preferred embodiment, the cyclocopolymerization is performed in deionized water. The free radical initiator, preferably tert-butyl hydroperoxide (TBHP), is then mixed to the reaction solution such that the reaction solution contains a final concentration of 25-125 mM, preferably 50-100 mM, preferably 60-80 mM, preferably 70-80 mM. In a preferred embodiment, the cyclcopolymerization is subsequently performed in a closed flask with mechanical stirring at a temperature of up to 100° C., preferably 0-100° C., preferably 20-100° C., preferably 40-98° C., preferably 60-98° C., preferably 80-95° C., preferably 90-95° C. or 95° C. and has a stirred reaction time of up to 24 hr, preferably 2-24 hr, preferably 4-24 hr, preferably 10-24 hr, preferably 12-23 hr, preferably 18-23 hr, preferably 20-22 hr or 22 hr. After several hours the mechanical stirrer may become static and the swollen soft solid may be transferred to water and allowed to soak with repeated changing of the water and/or soaked in a polar aprotic solvent, preferably acetone and filtered and dried in vacuo at temperatures in the range of 50-100° C., preferably 60-90° C., preferably 65-85° C., preferably 70-80° C. or 70° C. to form a polyzwitterion cross-linked cyclopolymeric resin (compound of formula (I), such as compound 1). In a preferred embodiment, the cyclocopolymerization reaction has a yield of greater than 30%, preferably greater than 35%, preferably greater than 40%, more preferably greater than 45%, more preferably greater than 50%.

In a preferred embodiment, the process may further comprise treating the polyzwitterion cross-linked cyclopolymeric resin (compound of formula (I), such as compound 1) after cyclocopolymerizing with a base to form a polyzwitterion/dianion cross-linked cyclopolymeric resin (compound of formula (I), such as compound 2). The basification can be performed by immersing and agitating the polyzwitterion cross-linked cyclopolymeric resin in an alkaline solution. The base may be a strong base (i.e. lithium hydroxide, sodium hydroxide, potassium hydroxide, etc.) or a weak base (i.e. potassium carbonate, ammonium hydroxide, sodium carbonate, calcium carbonate, sodium sulfate), preferably a strong base, most preferably sodium hydroxide (NaOH), preferably a 0.5-1.5 M solution of NaOH, preferably a 0.75-1.25 M solution, preferably a 0.9-1.1 M solution, preferably a 0.95-1.05M solution or a 1.0 M solution of NaOH. In a preferred embodiment, the basification is performed at a temperature of 0-60° C., preferably 15-50° C., preferably 20-40° C., preferably 20-30° C., more preferably 25° C. or room temperature and has a stirred reaction time of 0.5-6 hr, preferably 1-4 hr, preferably 1-3 hr, preferably 1.5-2.5 hr, or about 2 hr. In one embodiment, the polyzwitterion cross-linked cyclopolymeric resin may be advantageously agitated in a series of alkaline solutions to ensure a complete ionic exchange and form the polzwitterion/dianion cross-linked cyclopolymeric resin that is in basic form. The resin in basic form may be washed and rinsed with water or a non-aqueous solvent, preferably a polar protic solvent, preferably methanol and dried in vacuo at temperatures in the range of 50-100° C., preferably 50-80° C., preferably 60-70° C., or about 65° C., preferably until the resin reaches a constant weight to form a polyzwitterion/dianion cross-linked cyclopolymeric resin (compound of formula (I), such as compound 2). In a preferred embodiment, the base treatment has a yield of greater than 60%, preferably greater than 70%, preferably greater than 80%, more preferably greater than 85%.

According to a third aspect, the present disclosure relates to a method for removing heavy metals from an aqueous solution comprising i) contacting the cross-linked cyclopolymeric resin described herein in any of its embodiments with an aqueous solution comprising at least one heavy metal and ii) adsorbing the heavy metal onto the cross-linked cyclopolymeric resin described herein in any of its embodiments to form a heavy metal loaded cross-linked cyclopolymeric resin.

Non-limiting examples of aqueous solutions (i.e. heavy metal contaminated aqueous solutions), water sources and systems include, but are not limited to, surface water that collects on the ground or in a stream, aquifer, river, lake, reservoir or ocean, ground water that is obtained by drilling wells, run-off, industrial water, public water storage towers, public recreational pools and/or bottled water. Methods for removing heavy metals from aqueous solutions according to the present disclosure include contacting the cross-linked cyclopolymeric resin of the present disclosure in any of its embodiments with heavy metal contaminated water sources and systems. The methods may be carried out in tanks, containers, or small scale applications in both batch mode and fixed-bed or column mode. The heavy metal ion is preferably removed by adsorption, meaning the process is primarily physical and preferably no chemical changes are made upon the cyclopolymeric resin.

Cyclopolymeric resins of formula (I) such as compound 2 featuring phospho- and sulfo-propyl pendents possess both zwitterionic (+) and dianionic (=) groups present in the same repeating unit. Each repeating unit in the cross-linked cyclopolymeric resin of the present disclosure of formula (I) includes multiple ligand centers or chelating centers (i.e. $-O=PO_2^{-2}$, $-SO_3^-$, as well as possibly $X^-$ and $OH^-$) to which one or more heavy metal ions can be coordinated. In one embodiment, the number of ligand centers in a repeating unit of the cyclopolymeric resin depends on the values of x and y and is 5-200, preferably 10-150, preferably 15-100, preferably 20-75, preferably 25-50. The metal ions that are coordinated to the plurality of ligand centers are preferably heavy metal ions. Exemplary metal ions that can be adsorbed by the cross-linked cyclopolymeric resin of the present disclosure are of a wide range and include, but are not limited to, $Ag^+$, $Na^+$, $Pb^{2+}$, $Mn^{2+}$, $Fe^{2+}$, $Co^{2+}$, $Ni^{2+}$, $Cu^{2+}$, $Sn^{2+}$, $Cd^{2+}$, $Hg^{2+}$, $Cr^{3+}$, $Fe^{3+}$, $As^{3+}$, $Sb^{5+}$, $Cr^{6+}$, ions of zinc, ions of vanadium, ions of platinum, ions of palladium, ions of rhodium and mixtures thereof. In a preferred embodiment the heavy metal is $Pb^{2+}$, $Cu^{2+}$, $As^{3+}$ or $Ni^{2+}$, most preferably $Ni^{2+}$.

In one embodiment, the cross-linked cyclopolymeric resin of the present disclosure is effective in removing heavy metal samples wherein the initial concentration of the heavy metal ion, preferably $Ni^{2+}$ in the aqueous solution is 5-500 ppm, preferably 10-100 ppm, preferably 20-80 ppm. In a preferred embodiment, the cross-linked cyclopolymeric resin is present in the aqueous solution and/or contacted with the aqueous solution within a concentration range of 0.02-5.0 grams per liter volume of the treated aqueous solution, preferably 0.5-3.0 g $L^{-1}$, more preferably 1.0-2.0 g $L^{-1}$, or 1.5 g $L^{-1}$ of the resin relative to the volume of the aqueous solution.

In a preferred embodiment, the cross-linked cyclopolymeric resin of the present disclosure has an adsorption capacity of at least 30 mg of heavy metal per g of the cross-linked cyclopolymeric resin, preferably 30-150 mg $g^{-1}$, preferably 40-100 mg $g^{-1}$, more preferably 50-75 mg $g^{-1}$, more preferably 60-70 mg $g^{-1}$ based on the total weight of the cyclopolymeric resin. In a preferred embodiment, up to 90% of the total mass of the metal ion present in the aqueous solution is successfully removed from the aqueous solution at the end of the adsorption process following contacting, preferably up to 89%, preferably up to 88%, preferably up to 87%, preferably up to 86%, preferably up to 85%, preferably up to 80%, preferably up to 75%, preferably up to 70%, preferably up to 65%, preferably up to 60%, preferably up to 55%, preferably up to 50%, preferably up to 45%, preferably up to 40%, preferably up to 35%, preferably up to 30%, preferably up to 25%. In another embodiment, greater than 90% of the total mass of the metal ion present in the aqueous solution is successfully removed from the aqueous solution at the end of the adsorption process following contacting, preferably more than 95%, preferably greater than 99%.

There are various parameters in the method under which heavy metal ions are removed from the aqueous solution. Parameters such as contact time, agitation speed, and adsorbent dosages can be varied and their impacts on removal efficiency noted. In a preferred embodiment, the treatment and contacting process is carried out for 5-240 min, preferably 10-180 min, preferably 15-120 min, preferably 20-100 min, preferably 30-90 min, preferably 45-75 min, or 60 min. The duration needs to be long enough to ensure sufficient contact time between adsorbent cyclopolymeric materials and heavy metal ions; however, if the process is left to run too long, desorption may start to occur, resulting in bound heavy metal ions being released from the resin. In most instances, adsorption time requirements vary based on the nature of the interaction occurring between the adsorbent and the adsorbate. Generally, the adsorption by the cyclopolymeric resin of the heavy metal ion will increase with time, after which there is a slight and gradual decline in the adsorption. This is explained by the adsorption equilibrium phenomenon, in which the rate of adsorption is greater than the rate of desorption until equilibrium is reached at a certain contact time. At this time, the adsorption sites on the adsorbent may be saturated. Beyond this time, the rate of desorption is greater than the rate of adsorption, accounting for the slight and gradual decline in heavy metal ion adsorption beyond an optimum time. In one embodiment, greater than 90% of the total mass of the metal ion present in the aqueous solution is successfully removed from the aqueous solution within the first 30 min of contacting, preferably within the first 15 min of contacting.

In one embodiment, the method for removing metal ions is carried out at an aqueous sample pH range of 2.0-9.0, preferably 2.0-7.0, preferably 3.0-7.0, preferably 4.0-7.0, preferably 5.0-7.0, preferably 5.0-6.0, most preferably 5.5. In a preferred embodiment, the cross-linked cyclopolymeric resin of the present disclosure is effective in adsorbing heavy metal ions in an aqueous sample within a temperature range of 10-100° C., preferably 20-80° C., preferably 25-60° C., preferably 25-40° C., preferably 25-30° C. or room temperature.

In one embodiment, the method further comprises agitation of the aqueous solution before, during, or after the contacting. The agitation can encompass shaking, stirring, rotating, vibrating, sonicating and other means of increasing contact between the adsorbent and the adsorbate. Further, agitation can be performed by hand or mechanically. In one embodiment, the treatment and contacting process may be enhanced by mechanical shaking or agitation, preferably by a bath shaker at a speed of up to 200 rpm, preferably 50-200 rpm, preferably 75-175 rpm, preferably 100-150 rpm or 150 rpm in order to increase contact between adsorbent (cross-linked cyclopolymeric resin) and adsorbate (heavy metal ions). Adsorption is the key mechanism of removing heavy metals in the present disclosure, a requirement is contact between the adsorbent material and the target adsorbate. There is generally an increase in the removal efficiency with increasing agitation speed until a certain level. The poor removal of heavy metal ions at lower agitation speeds is attributable to a lack of contact between the active adsorption sites of the cyclopolymeric resin and the heavy metal ions as adsorbents may have settle in the vessel the method is carried out in.

In one embodiment, the method further comprises washing or desorbing the heavy metal loaded cross-linked cyclopolymeric resin free of the adsorbed heavy metal ions to reform the cross-linked cyclopolymeric resin such that the resin can be recycled and/or reused in another contacting and removal. In a preferred embodiment, the cyclopolymeric resin can be desorbed and reused up to 15 times without a loss in adsorption capacity, preferably up to 12 times, preferably up to 10 times, preferably up to 8 times, more preferably up to 5 times. In certain embodiments, the cross-linked cyclopolymeric resin of the present disclosure can be regenerated and reused as a heavy metal adsorbent for at least 5 cycles with minimal, if any, decrease in adsorption efficiency, no more than a 2% decrease in $Ni^{2+}$ removal with each regeneration cycle. In one embodiment, to regenerate the adsorbent, metal ions are desorbed from the cross-linked cyclopolymer of formula (I) by treating the heavy metal loaded cross-linked cyclopolymeric resin in an acidic solution of at least 0.5 M in concentration, preferably at least 1.0 M in concentration for 10-180 min, preferably 30-160 min, preferably 60-120 min, preferably 90-120 min or 120 min. Strong acids including, but not limited to HCl, $H_2SO_4$, and $HNO_3$ are preferred, but organic acids and weak acids (i.e. acetic acid) may also be used in the desorption process, most preferably $HNO_3$.

In one embodiment, the metal ion removal or adsorption process by the cross-linked cyclopolymeric resin is an endothermic process, as indicated by a determined positive 4H value, preferably greater than 5 kJ/mol, preferably greater than 10 kJ/mol, preferably greater than 15 kJ/mol, preferably greater than 20 kJ/mol. In one embodiment, the metal ion removal or adsorption process by the cross-linked cyclopolymeric resin is a spontaneous process as indicated by a determined negative $\Delta G$ value, preferably −1 to −5 kJ/mol, and the adsorption has a low potential barrier, preferably less than 20 kJ/mol, assigning it predominantly to a physical sorption rather than chemisorption.

The examples below are intended to further illustrate protocols for preparing and characterizing the compounds, monomers and cross-linked cyclopolymeric resins of the present disclosure. Further, they are intended to illustrate assessing the properties of these compounds, monomers and cross-linked cyclopolymeric resins. They are not intended to limit the scope of the claims.

Example 1

Chemicals and Materials

Standard stock solution of nickel (II) (1000 mg/L), hydrochloric acid, nitric acid and sodium hydroxide were purchased from Sigma-Aldrich and used as received without further purification, they are of analytical grade. The nickel standard stock solution was diluted to various concentrations as required for the experiment. An organic tertiary butyl hydroperoxide (TBHP) (with 70 w/w % in water), diallylamine (≥98% purity), piperazine (97% purity), allyl chloride (98% purity), 1,3-propanesultone (≥98% purity) were purchased from Fluka (AG) and used as received without further purification.

Example 2

Synthesis of the Cross-Linked Cyclopolymeric Resins

Monomer compound 3 and monomer compound 4 were synthesized using literature procedures [Haladu, S. A. and S. A. Ali, *A pH-responsive cyclopolymer having phospho-and sulfopropyl pendents in the same repeating unit: Synthesis, characterization, and its application as an antiscalant.* J. Polym. Sci., Part A: Polym. Chem., 2013. 51 (Copyright (C) 2014 American Chemical Society (ACS). All Rights Reserved.): p. 5130-5142.; and Ali, S. A., S. Z. Ahmed, and E. Z. Hamad, *Cyclopolymerization studies of diallyl-and* tetraallylpiperazinium salts. J. Appl. Polym. Sci., 1996. 61 (Copyright (C) 2014 American Chemical Society (ACS). All Rights Reserved.): p. 1077-1085.—each incorporated herein by reference in its entirety]. Briefly, monomer compound 3 was synthesized by the reaction of propanesultone and diethyl 3-(diallylamino)propylphosphonate followed by ester hydrolysis. Monomer compound 4 was obtained by reacting allyl chloride with piperazine.

Butler's cyclopolymerization protocol was employed to cyclopolymerize the monomer compound 3 (90%) and the cross-linker monomer compound 4 (90%) to afford the cross-linked polyzwitterion (CPZ) compound 1 in good yield [Butler, G. B., *Cyclopolymerization and cyclocopolymerization*. 1992, Marcel Dekker: New York.—incorporated herein by reference in its entirety]. The monomer compound 3 (10.53 g, 30.85 mmol) and cross-linker monomer compound 4 (1.1 g, 3.45 mmol) were dissolved in deionized water followed by the addition of tert-butyl hydroperoxide TBHP (640 mg). The mixture in a closed flask was stirred for 22 hours at 95° C. After several hours the magnetic stir bar became static. The swollen soft solid was transferred to water and allowed to soak with repeated changing of the water. The resin compound 1 was soaked in acetone, filtered and dried in vacuo at 70° C. (5.1 g, 49% yield).

The polyzwitterion/dianionic resin (CPZDA) compound 2 was finally obtained by the treatment of cross-linked cyclopolymeric resin compound 1 with NaOH. The cyclopolymeric resin compound 1 (5.48 g, 16.2 mmol) was mixed with sodium hydroxide (1.94 g, 48.6 mmol) in water (50 mL) and stirred for 2 hours. After adding excess methanol, cyclopolymeric resin compound 2 was filtered and then dried in vacuo at 65° C. and obtained as a grey colored powder (5.2 g, 85% yield). The new resin features zwitterionic as well as dianionic moieties on each repeating unit. Hence, the availability of the abundant anionic functionalities qualifies the resin to have metal adsorption capabilities.

Example 3

Adsorption Tests

The adsorption behavior of the synthesized cyclopolymeric resins was investigated for the removal of Ni (II) from aqueous solutions. A predetermined amount of adsorbent was added into 20 mL of Ni (II) solution in a container made of plastic and placed in a bath shaker at a speed of 150 rpm until the equilibrium was reached. The temperature effect on the adsorption behavior was also investigated by adjusting the bath temperature and thus, the solutions. After the experiment for the adsorption evaluation, the nickel loaded cross-linked cyclopolymeric resin was eluted by stirring with $HNO_3$ (1M) at room temperature for 120 min to desorb the nickel. The resin was then washed with deionized water, allowed to dry and subsequently reapplied for the adsorption of Ni (II). The adsorption and desorption procedure was repeated several times.

The % of removed Ni (II) ions from the solution was computed by the equation of formula (V).

$$\% \text{ Removal} = \frac{C_0 - C_e}{C_0} \times 100 \quad \text{(V)}$$

The amount of Ni (II) adsorbed per unit mass of the resin at equilibrium ($q_e$, mg/g) and at a time t ($q_t$, mg/g) (adsorption capacity) was computed from the equations of formula (VI) and formula (VII).

$$q_e = (C_0 - C_e) \times \frac{V}{m} \quad \text{(VI)}$$

$$q_e = (C_0 - C_t) \times \frac{V}{m} \quad \text{(VII)}$$

In these formulas, it is given that $C_0$ (mg/L) denotes the initial Ni (II) concentration, $C_e$ and $C_t$ (mg/L) are the Ni (II) concentrations at the equilibrium liquid phase and at a time t, V (L) is the volume of the solution, and m (g) is the amount (mass) of the used resin.

The pH value of the initial Ni (II) solution is considered an important parameter in the adsorption. The pH affects the surface charge of the adsorbent as well as the conversion of the nickel species. The Ni (II) speciation is related to the pH value of the solution [Zhao, Y.-G., et al., *Preparation and characterization of amino-functionalized nano-Fe3O4 magnetic polymer adsorbents for removal of chromium (VI) ions*. Journal of materials science, 2010. 45(19): p. 5291-5301.—incorporated herein by reference in its entirety]. The pH of the initial solutions was varied within the range of 3.0 to 7.0. Studies at pH >7 were not executed to avoid metal ion precipitation. The maximum % removal was achieved at a range of pH 5-7. According to the nickel (II) speciation diagram, nickel (II) ions precipitate as nickel hydroxides in solutions of pH >6.0 [Tan, X., et al., *Sorption speciation of nickel (II) onto Ca-montmorillonite: Batch, EXAFS techniques and modeling*. Dalton Transactions, 2011. 40(41): p. 10953-10960.; and Srivastava, V. C., I.D. Mall, and I. M. Mishra, *Competitive adsorption of cadmium (II) and nickel (II) metal ions from aqueous solution onto rice husk ash*. Chemical Engineering and Processing: Process Intensification, 2009. 48(1): p. 370-379.—each incorporated herein by reference in its entirety].

At low pH values of 1 to 6, nickel exists mainly in the form Ni (II), in addition to other forms, nickel exhibits oxidation states of (−1 to +4). All of these species are positively charged which make them attractive to the negatively charged active motifs on the polymer chain, and thus get them adsorbed on the polymer. The low adsorption of nickel at pH 3.0 could be justified by the high competition between the excess protons ($H^+$) which can compete with the nickel ions, resulting in a lower adsorption. The nickel uptake was found to increase with increase in pH. This could be attributed to less competition between the $H_3O^+$ (hydronium ions) and the nickel species for the surface motifs. At pH >7, nickel removal can be accomplished by concomitant precipitation and sorption. Therefore, in the present study, a pH of 5.5 was chosen for the experiments to avoid the precipitation of the nickel in accordance with previous reports [Srivastava, V. C., I.D. Mall, and I. M. Mishra, *Competitive adsorption of cadmium(II) and nickel(II) metal ions from aqueous solution onto rice husk ash*. Chemical Engineering and Processing: Process Intensification, 2009. 48(1): p. 370-379.—incorporated herein by reference in its entirety].

In order to examine the influence of contact time on the Ni (II) uptake by the resin, a batch experiment with initial concentrations of 5, 10, and 20 ppm was carried out. The experiments for the contact time were performed at a room temperature of 24° C. At the initial stages, the fast adsorption of Ni (II) ions can be explained by the availability of the active motifs and uncovered surface of the polymer. The adsorption increase with increase in contact time until equilibrium is reached, at around 60 min. After that, increasing the contact time has no considerable enhancement on the adsorption percentage. Comparing with some reported adsorbents, the present resin has the advantage of rapid adsorption of Ni (II).

The reusability of the resin is important for the economic development of the resin as disposing of the exhausted sorbent loaded with the adsorbates may cause detrimental environmental impacts. Therefore, to evaluate the reusability of the resin, the adsorption followed by desorption cycle was repeated five times with the same dose. The resin shows good recovery with approximately stable efficiency. This highlights the potential commercial applications of the resin for the adsorption of Ni (II) from aqueous solutions.

Example 4

Characterization of the Cross-Linked Cyclopolymeric Resins.

The cross-linked cyclopolymeric resin and the nickel loaded cross-linked cyclopolymeric resin were characterized by scanning electron microscopy (SEM), energy dispersive X-ray spectroscopy (EDX) and Fourier transform infrared spectroscopy (FTIR). Scanning electron microscopy (SEM) was used to determine the surface morphology of the cross-linked cyclopolymeric resin before and after the adsorption of nickel. Energy dispersive X-ray spectroscopy (EDX) equipped with a detector model X-max was utilized for elemental analysis of the cross-linked cyclopolymeric resin and Ni (II) loaded cross-linked cyclopolymeric resin. Ni (II) determination was carried out with a Thermo Scientific iCE 3000 flame atomic absorption spectrometer (FAAS) equipped with a 10 cm air-acetylene burner. Inductively coupled plasma mass spectrometry (ICP-MS) model ICP-MS XSERIES-II Thermo Scientific, was used for the determining the metals concentrations of some metals in real wastewater samples. Thermogravimetric analysis (TGA) was utilized coupled with a SDT analyzer (Q600: TA Instruments, USA). The polymer weighing ~6 mg was taken in an aluminum crucible. The temperature was raised continuously at a uniform rate of 15° C. per minute and across a temperature range of 20-800° C. in a nitrogen atmosphere at 50 cm$^3$ per minute flow rate for the duration of the whole analysis. The FTIR spectrometer (Perkin-Elmer 16F PC) was used to record the IR spectra.

Figure 2:
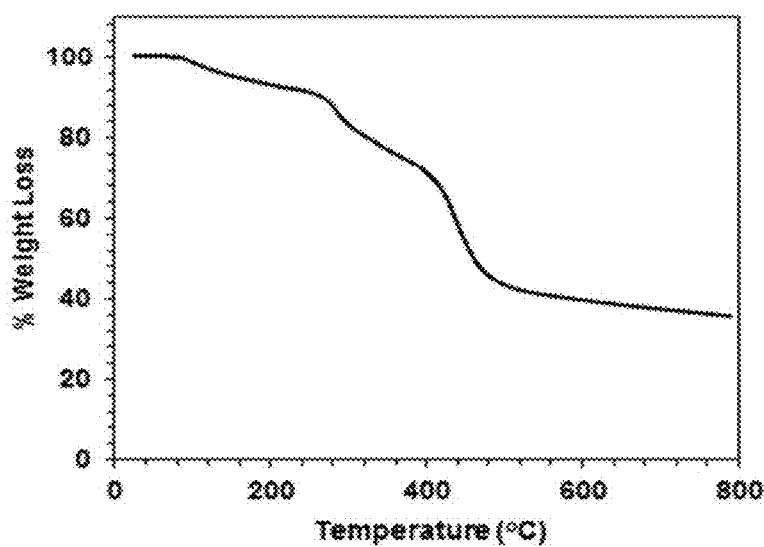
FIG. 2 is a thermal gravimetric analysis (TGA) of the cross-linked cyclopolymeric resin compound 2.

The first (16.6%) and the second (47.7%) major weight losses shown by the thermogravimetric analysis (TGA) curve of cross-linked cyclopolymeric resin compound 2 (FIG. 2) were attributed to loss of $SO_2$ and decarboxylation of the pendant carboxylate groups with the release of $CO_2$, $NO_2$ and $H_2O$ gases resulting from the combustion of nitrogenated organic fractions respectively. The residual mass at 800° C. was found to be 35.7%, which may be attributed to $Na_2O.1.5P_2O_5$.

Figure 3:
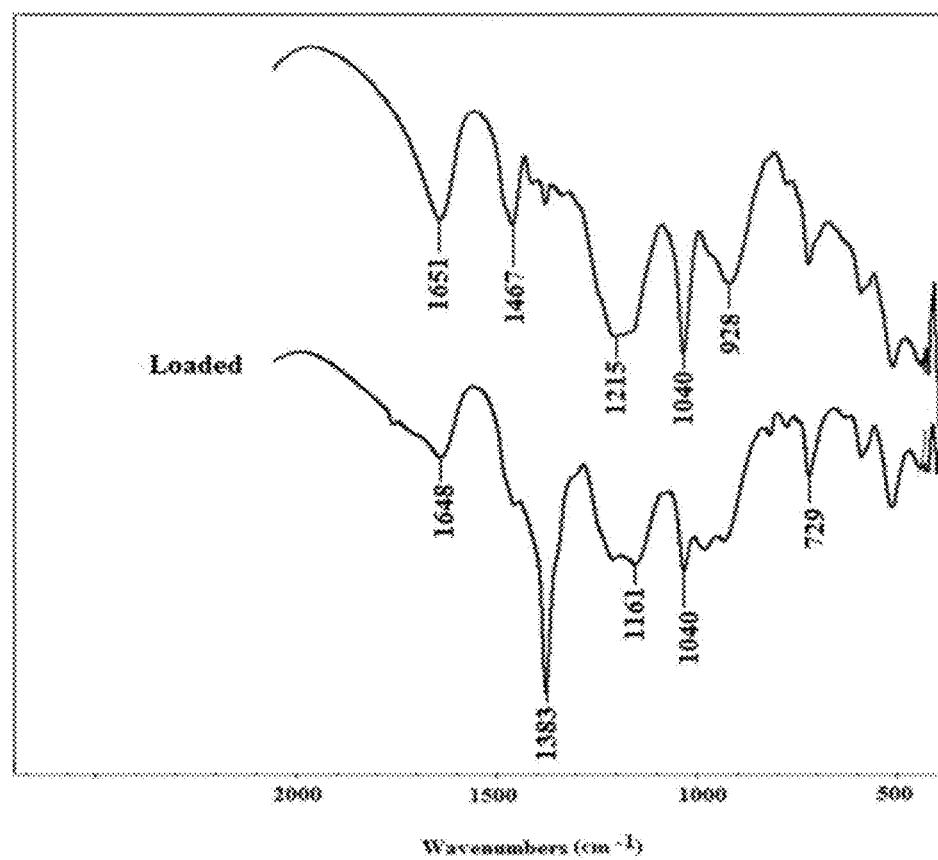
FIG. 3 is an infrared spectroscopy (IR) analysis of the cross-linked cyclopolymeric resin compound 2 and an IR analysis of the cross-linked cyclopolymeric resin compound 2 loaded with Ni.

The infrared (IR) spectrum of cross-linked cyclopolymeric resin compound 2 is shown in FIG. 3. Absorptions around ~1215 and ~1040 cm$^{-1}$ show the presence of sulfonate as well as phosphonate groups in the polymers. The C—N absorption appears at around ~1466 cm$^{-1}$. The peak around 1651 cm$^{-1}$ was attributed to the H—O—H bending vibration. Looking at the IR spectrum of the resin after loading with nickel (FIG. 3) displays the increase in the intensity together with broadening of the phosphonate P—O vibrations due to adsorption of the metal [Kolodynska, D., Z. Hubicki, and S. Pasieczna-Patkowska, FT-IR/PAS studies of Cu(II)-EDTA complexes sorption on the chelating ion exchangers. Acta Phys. Pol., A, 2009. 116 (Copyright (C) 2014 American Chemical Society (ACS). All Rights Reserved.): p. 340-343.—incorporated herein by reference in its entirety]. The new absorption band at 1383 cm$^{-1}$ is attributed to an ionic nitrate group by the fact the adsorption studies were performed in the presence of nickel nitrates [Sahni, S. K., B. R. Van, and J. Reedijk, *A spectral study of transition-metal complexes on a chelating ion-exchange resin containing aminophosphonic acid groups*. Polyhedron, 1985. 4 (Copyright (C) 2014 American Chemical Society (ACS). All Rights Reserved.): p. 1643-58.—incorporated herein by reference in its entirety]. Apparently, the nitrate ion absorption band is missing in the IR spectrum of the unloaded cross-linked cyclopolymeric resin compound 2.

Figure 7A:
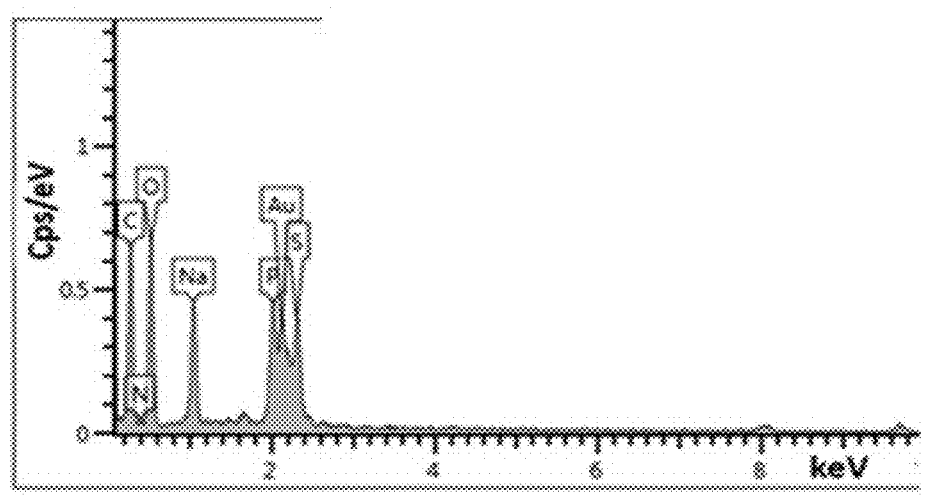
FIG. 7A is an energy dispersive X-ray spectroscopy (EDX) analysis of the cross-linked cyclopolymeric resin compound 2.
Figures 7B, 8:
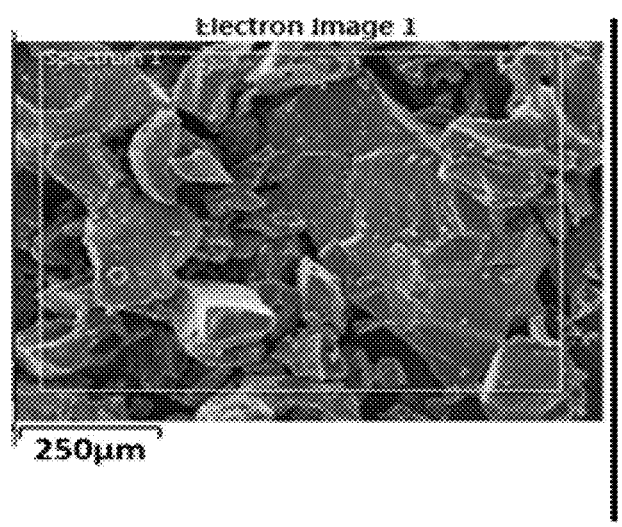
FIG. 7B is a table of quantitative microanalysis from the EDX analysis of the cross-linked cyclopolymeric resin compound 2.
FIG. 8 is a SEM image of the cross-linked cyclopolymeric resin compound 2 loaded with Ni.
Figures 9A, 9B:
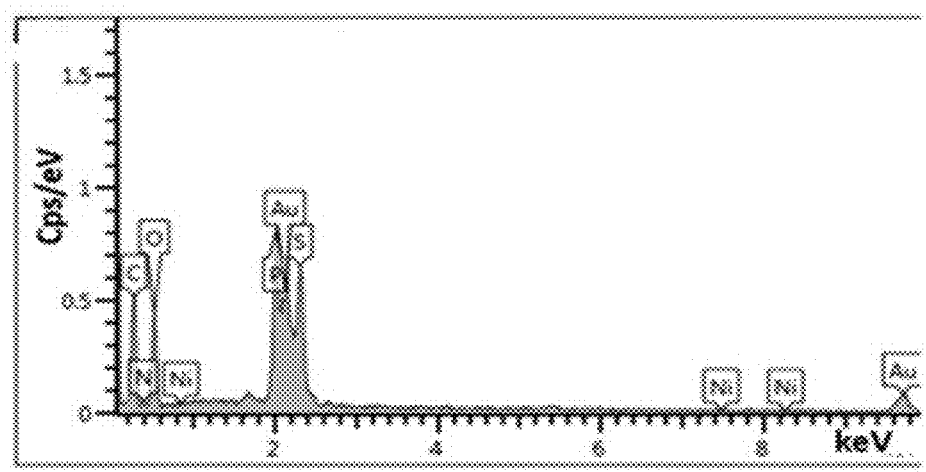
FIG. 9A is an EDX analysis of the cross-linked cyclopolymeric resin compound 2 loaded with Ni.
FIG. 9B is a table of quantitative microanalysis from the EDX analysis of the cross-linked cyclopolymeric resin compound 2 loaded with Ni.

A scanning electron microscope (SEM) and energy dispersive X-ray (EDX) analysis were performed to examine the surface morphology and the structure of the cross-linked cyclopolymeric resin before and after adsorption (FIG. 6, FIG. 7A, FIG. 7B, FIG. 8, FIG. 9A and FIG. 9B). In the EDX spectrum of the nickel loaded resin, adsorption of nickel is indicated by the characteristic peaks for Ni (II) at 5.4 and 0.57 keV in addition to the peaks of the other elements constituting the resin. The inset tables in FIG. 7B and FIG. 9B present the apparent concentration and the elemental weight percent's of all the elements present in the loaded and unloaded resin.

Example 5

Kinetics of the Adsorption

The adsorption kinetics is useful to predict the rate of adsorption and provide valuable data for understanding the mechanism of the sorption. Here, two models (Lagergren's pseudo-first order and pseudo-second order) were employed in order to understand the mechanisms of Ni (II) adsorption on the resin. The equation for Lagergren's pseudo-first order kinetics is presented as formula (VIII).

$$\ln(q_e - q_t) = \ln q_e - k_1 t \qquad \text{(VIII)}$$

Figure 4A:
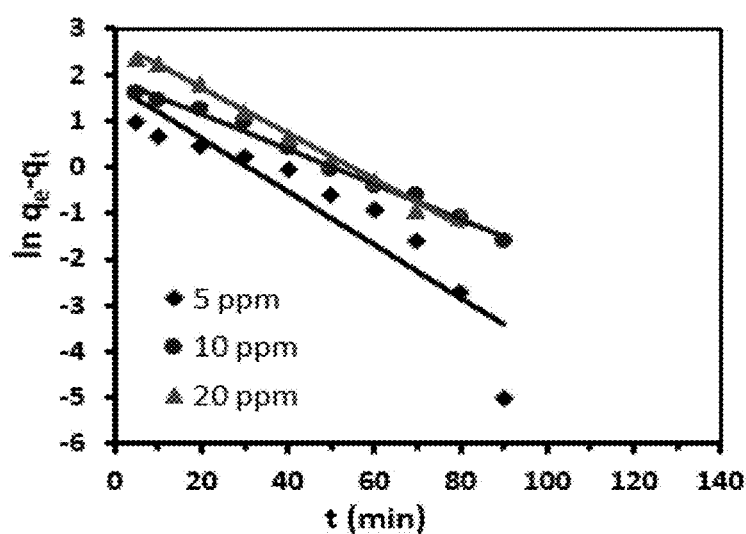
FIG. 4A is a Lagergren's pseudo-first order plot for Ni (II) adsorption on the cross-linked cyclopolymeric resin compound 2 at various initial concentrations at pH 5.5, 23° C. and shaker agitation speed of 150 rpm.

In this formula $q_t$ and $q_e$ stand for the amounts of Ni (II) (mg/g) adsorbed at a time t and at equilibrium respectively [Lagergren, S., *About the theory of so-called adsorption of solution substances, kunglia srenska vertens Ka psakademiens Handlingar*. 1898. 24: p. 1-39.—incorporated herein by reference in its entirety]. In addition, $k_1$ stands for the rate constant of the first order (min$^{-1}$). The values of $k_1$ and adsorption density $q_e$ are obtained from the plots of $\ln(q_e - q_t)$ versus t (FIG. 4A) and presented in Table 1. Comparing the experimental value observed for equilibrium adsorption ($q_{e, exp}$) with the one computed theoretically ($q_{e, cal}$), it is clear that there is no agreement between the values. The obtained correlation coefficients ($R^2$) for the first model show poor linearity. This assumes that the adsorption deviates from the Lagergren's pseudo-first model.

The pseudo-second order kinetic model is expressed using the adsorption kinetic rate equation of formula (IX).

$$\frac{dq_t}{dt} = k_2 (q_e - q_t)^2 \qquad \text{(IX)}$$

In this formula, $k_2$ depicts the rate constant of the pseudo-second order adsorption (g/mg·min), $q_e$ and $q_t$ are the adsorbed amount (capacity) of Ni (II) at equilibrium and at a time t [Ho, Y.-S., *Review of second-order models for adsorption systems*. Journal of hazardous materials, 2006. 136(3): p. 681-689.; and Weber, T. W. and R. K. Chakravorti, *Pore and solid diffusion models for fixed-bed adsorbers*. AIChE Journal, 1974. 20(2): p. 228-238.—each incorporated herein by reference in its entirety]. The linear form of the pseudo-second order can be express by formula (X).

$$\frac{t}{q_t} = \frac{1}{k_2 q_e^2} + \frac{t}{q_e} \quad (X)$$

Figure 4B:
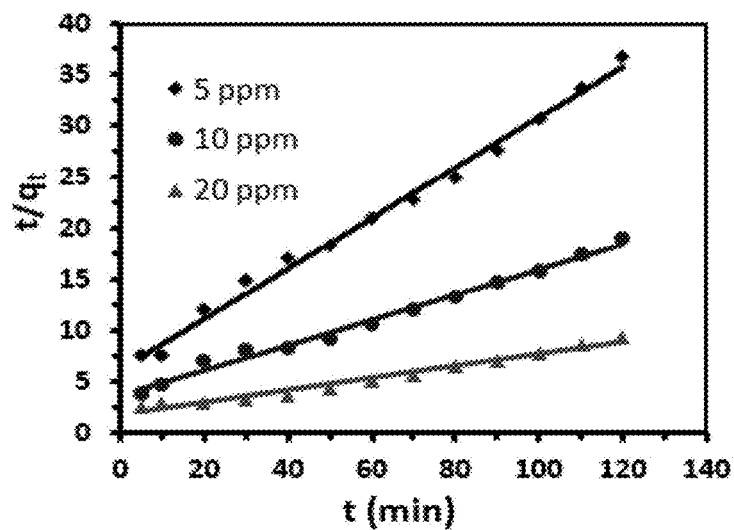
FIG. 4B is a pseudo-second order plot for Ni (II) adsorption on the cross-linked cyclopolymeric resin compound 2 at various initial concentrations at pH 5.5, 23° C. and shaker agitation speed of 150 rpm.

In this formula, $k_2$, the rate constant (g/mg·min) is obtained by a plot of $t/q_t$ against t (FIG. 4B). All of the kinetic parameters are listed in Table 1. The initial adsorption rate is $h=k^2 q_e^2$ (mg/g·min). The values of the correlation coefficients ($R^2>0.99$) for all the concentrations indicate that the adsorption process goes in line with the pseudo-second order kinetic model and the Ni (II) ions were adsorbed on the resin via chemical interaction. This is supported by the close agreement of the equilibrium adsorption capacities (qe, cal) with the experimentally observed data (qe, exp), as seen in Table 1. Other reports on the adsorption of Ni (II) on other adsorbents also observed similar phenomena [Ozcan, A., A. Ozcan, and O. Gok, *Adsorption kinetics and isotherms of anionic dye of reactive blue 19 from aqueous solutions onto DTMA-sepiolite*. Hazardous Materials and Wastewater—Treatment, Removal and Analysis, Nova Science Publishers, New York, 2007.; and Periasamy, K. and C. Namasivayam, *Removal of nickel (II) from aqueous solution and nickel plating industry wastewater using an agricultural waste: peanut hulls*. Waste management, 1995. 15(1): p. 63-68.; and Malkoc, E. and Y. Nuhoglu, *Investigations of nickel(II) removal from aqueous solutions using tea factory waste*. Journal of Hazardous Materials, 2005. 127(1-3): p. 120-128.—each incorporated herein by reference in its entirety].

The intraparticle diffusion model is normally used to identify the adsorption mechanism. A plot of $q_t$ versus $t^{0.5}$ should be a straight line when the mechanism of the adsorption follows the intraparticle diffusion where the adsorbate ions diffuse in the intraparticle pore of the adsorbent. However, more than one step could possibly govern the process if the data exhibits multi-linear plots. The intraparticle diffusion coefficient, $k_{id}$, can be determined by fitting the experimental data in the intraparticle diffusion model expressed by formula (XI).

$$q_t = k_{id} t^{1/2} + C \quad (XI)$$

Figure 4C:
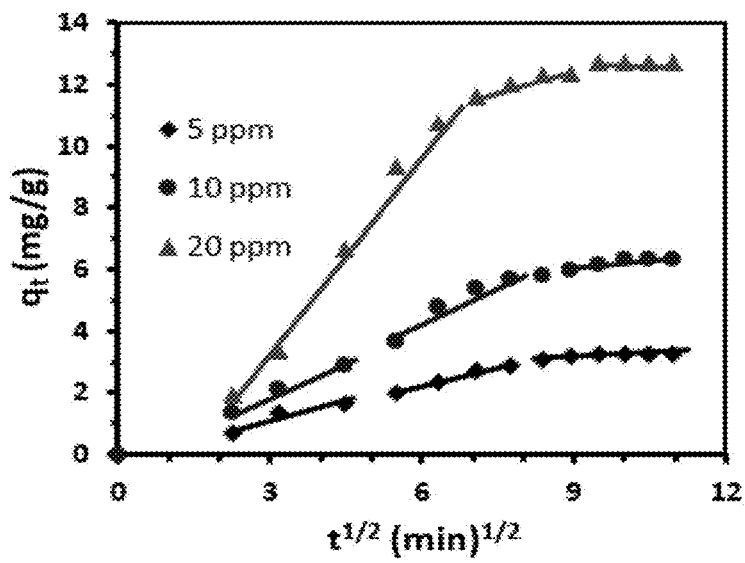
FIG. 4C is an intraparticle diffusion plot for Ni (II) adsorption on the cross-linked cyclopolymeric resin compound 2 at various initial concentrations at pH 5.5, 23° C. and shaker agitation speed of 150 rpm.

In this formula, $k_{id}$ is the intraparticle diffusion rate constant (mg/g·min$^{1/2}$) and C is the intercept (mg/g). The experimental data, FIG. 4C, revealed that the plot of $q_t$ versus $t^{1/2}$ is multi-linear, indicating that three steps are involved in the process (adsorption) and intraparticle diffusion is not the only rate-limiting step [Srivastava, S., R. Tyagi, and N. Pant, *Adsorption of heavy metal ions on carbonaceous material developed from the waste slurry generated in local fertilizer plants*. Water Research, 1989. 23(9): p. 1161-1165.; and Annadurai, G., R.-S. Juang, and D.-J. Lee, *Use of cellulose-based wastes for adsorption of dyes from aqueous solutions*. Journal of Hazardous Materials, 2002. 92(3): p. 263-274.; and Langmuir, I., The adsorption of gases on plane surfaces of glass, mica and platinum. J. Am. Chem. Soc, 1918. 40: p. 1362-1403.; and Wu, F.-C., R.-L. Tseng, and R.-S. Juang, *Adsorption of dyes and phenols from water on the activated carbons prepared from corncob wastes*. Environmental technology, 2001. 22(2): p. 205-213.—each incorporated herein by reference in its entirety]. It was observed that there are three linear portions that explain the adsorption stages; these are the external mass transfer in the initial period, intraparticle diffusion of Ni (II) on the resin, and adsorption on the interior sites. The intraparticle diffusion constant values are shown in Table 1.

TABLE 1

Kinetic constant parameters obtained for Ni (II) adsorption on the cross-linked cyclopolymeric resin compound 2

| | $q_e$, | Lagergren's pseudo-first order | | | Pseudo-second order | | | Intraparticle diffusion model | | |
|---|---|---|---|---|---|---|---|---|---|---|
| $C_i$ (mg/L) | exp (mg/g) | $k_1$ (min$^{-1}$) | $q_e$, cal. (mg/g) | $R^2$ | $k_2{}^a$ | $q_e$, cal. (mg/g) | $R^2$ | $k_{id}{}^b$ | C (mg/g) | $R^2$ |
| 5 | 3.27 | 0.0574 | 5.75 | 0.8530 | 0.0095 | 4.08 | 0.9991 | 0.621 | 0.190 | 0.9901 |
| 10 | 6.33 | 0.0379 | 8.17 | 0.9401 | 0.0038 | 8.15 | 0.9963 | 0.920 | 2.91 | 0.9991 |
| 20 | 12.73 | 0.1152 | 43.80 | 0.9630 | 0.0022 | 16.7 | 0.9566 | 0.701 | 3.51 | 0.9510 |

$^a$(g/mg · min).
$^b$(mg/g · min).

Example 6

Isotherms of the Adsorption

Isotherms provide fundamental physiochemical data to evaluate sorption capacity. In the present study, three isotherms were employed to analyze the experimental results. The Langmuir isotherm model introduces a concept of forming a single (monolayer) surface phase (a monomolecular adsorption) on energetically homogeneous surfaces of the adsorbent. Thus, the Langmuir equation describes a physical or chemical adsorption on solid surfaces [Dabrowski, A., *Adsorption—from theory to practice*. Advances in colloid and interface science, 2001. 93(1): p. 135-224.—incorporated herein by reference in its entirety]. This is called the ideal localized monolayer model and the linear Langmuir equation is given by formula (XII).

$$\frac{C_e}{q_e} = \frac{1}{k_L q_m} + \frac{C_e}{q_m} \quad (XII)$$

Figure 5A:
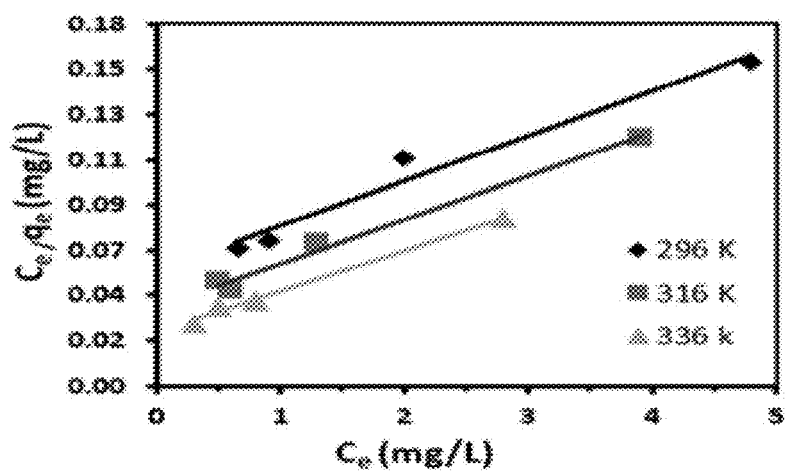
FIG. 5A is a Langmuir adsorption isotherm for Ni (II) adsorption on the cross-linked cyclopolymeric resin compound 2 at an initial concentration of 40 ppm and different resin dosages.

In this formula, $k_L$ is the Langmuir equilibrium constant (L/mg) related to the affinity of adsorption sites, and $q_m$ (mg/g) is the maximum theoretical monolayer adsorption capacity, $C_e$ is the equilibrium concentration (mg/L) of Ni (II) in solution and $q_e$ is the amount of nickel ions adsorbed (mg/g) at equilibrium. FIG. 5A depicts the plot of $C_e/q_e$ versus $C_e$. The values of Langmuir constants $q_m$ and $k_L$ were computed from the slope and intercept of the plot and are given in Table 2. From the data, the adsorption capacity $q_m$ was determined by the linear Langmuir equation to be 13 mg/g of Ni (II), with the $k_L$ of 0.4 L/mg and the $R^2$ value of 0.99, proving that the data fitted the Langmuir isotherm model.

The characteristic parameter of the Langmuir isotherm is illustrated in terms of the dimensionless equilibrium parameter $R_L$, also known as separation factor, defined by Weber and Chakkavorti by formula (XIII).

$$R_L = \frac{1}{1 + K_L C_0} \quad \text{(XIII)}$$

In this formula, $C_0$ is the initial solute concentration. The value $R_L$ gives an indication of the type of the isotherm and the nature of the adsorption process. It indicates whether the adsorption nature is either unfavorable ($R_L>1$), linear ($R_L=1$), favorable ($0<R_L<1$) or irreversible ($R_L=0$). From the data calculated and presented in Table 2, the $R_L$ of 0.044 indicates the favorable nature of the adsorption. The maximum adsorption capacities from the Langmuir isotherm of the present adsorbent for the removal of Ni (II) was compared with those of other adsorbents reported in the literature as shown in Table 3[Rao, M., A. V. Parwate, and A. G. Bhole. "Removal of Cr 6+ and Ni 2+ from aqueous solution using bagasse and fly ash." *Waste management* 22.7 (2002): 821-830.; and Pradhan, Swapna, Shyam S. Shukla, and Kenneth L. Dorris. "Removal of nickel from aqueous solutions using crab shells." *Journal of hazardous materials* 125.1 (2005): 201-204.; and Kandah, Munther Issa, and Jean-Luc Meunier. "Removal of nickel ions from water by multi-walled carbon nanotubes." *Journal of hazardous materials* 146.1 (2007): 283-288.—each incorporated herein by reference in its entirety].

TABLE 3-continued

Comparison of the adsorption capacity of the cross-linked cyclopolymeric resin compound 2 with the adsorption capacity of various adsorbents for Ni (II)

| Adsorbent | Adsorption Capacity $q_m$ (mg/g) |
|---|---|
| Cross-linked cyclopolymeric resin compound 2 | 46.7 at pH 5.5, 316 K |
| | 50.8 at pH 5.5, 336 K |

The Freundlich model is used to describe the sorption characteristics on heterogeneous surfaces taking into account the interactions between the adsorbed molecules using the empirical equation of formula (XIV).

$$q_e = K_f C_e^{\frac{1}{n}} \quad \text{(XIV)}$$

In this formula, $K_f$ (mg/g) is the Freundlich isotherm constant indicating adsorption capacity and n is the adsorption intensity while 1/n is a function of the strength of the adsorption, $C_e$ is the equilibrium concentration of adsorbate (mg/L) and $q_e$ is the amount of adsorbate per adsorbent at equilibrium (mg/g). The logarithmic form of Freundlich is defined as formula (XV).

$$\ln q_e = \ln K_f + \frac{1}{n} \ln C_e \quad \text{(XV)}$$

Figure 5B:
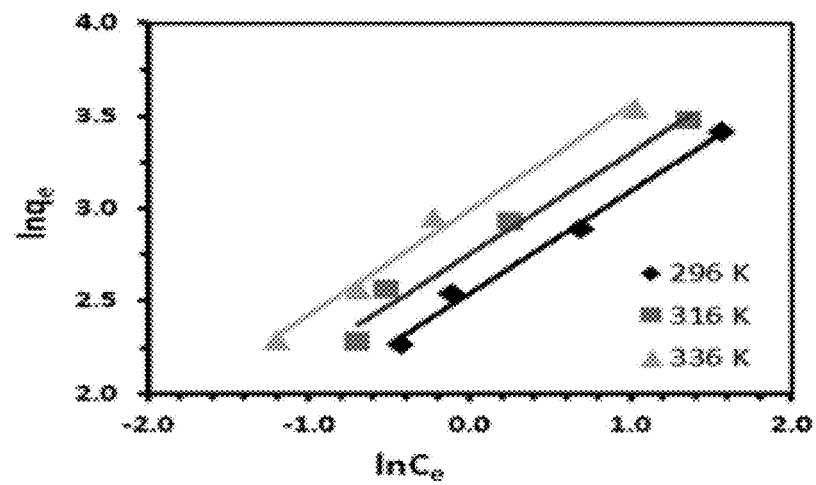
FIG. 5B is a Freundlich adsorption isotherm for Ni (II) adsorption on the cross-linked cyclopolymeric resin compound 2 at an initial concentration of 40 ppm and different resin dosages.

From the plot of ln $q_e$ versus ln $C_e$, shown in FIG. 5B, $K_f$ and n were calculated, their values are shown in Table 2. The n

TABLE 2

Langmuir, Freundlich and Temkin isotherm constants for Ni (II) adsorption on the cross-linked cyclopolymeric resin compound 2

| | Langmuir Isotherm | | | | Freundlich isotherm | | | | Temkin isotherm | | |
|---|---|---|---|---|---|---|---|---|---|---|---|
| T (K) | $q_m$ (mg/g) | $k_L$ (L/mg) | $R_L$ | $R^2$ | 1/n | n | $k_f$ (mg/g) | $R^2$ | $k_T$ (L/g) | $b_T{}^a$ | $R^2$ |
| 296 | 45.5 | 0.40 | 0.34 | 0.999 | 0.55 | 1.82 | 12.68 | 0.991 | 3.78 | 0.248 | 0.978 |
| 316 | 46.7 | 0.62 | 0.38 | 0.989 | 0.49 | 2.04 | 15.64 | 0.977 | 5.11 | 0.234 | 0.992 |
| 336 | 50.8 | 0.74 | 0.64 | 0.995 | 0.46 | 2.17 | 19.88 | 0.988 | 7.08 | 0.218 | 0.990 |

$^a$(kJ/mol)

TABLE 3

Comparison of the adsorption capacity of the cross-linked cyclopolymeric resin compound 2 with the adsorption capacity of various adsorbents for Ni (II)

| Adsorbent | Adsorption Capacity $q_m$ (mg/g) |
|---|---|
| Peanut hulls | 26.35 at pH 5, 296 K |
| Waste tea | 15.26 at pH 5.5, 296 K |
| PAC | 31.08 at pH 8, 296 K |
| Crab Shell | 23.99 at pH 7, 296 K |
| Multi-walled carbon nanotubes | 49.261 at pH 6, 296 K |
| | 45.5 at pH 5.5, 296 K | value gives an indication of the favorability of the adsorption process. The value of n>1 represents a favorable adsorption. A value of 1/n<1 indicates a normal adsorption while 1/n>1 indicates a cooperative adsorption. In the current study the value of 1/n is 0.3 indicating a favorable adsorption process of Ni (II) on the resin. The value of $K_f$ is 19.8 mg/g and $R^2$ is 0.95 indicating that the data does not fit this model especially well.

The Temkin model takes into account the adsorbent-adsorbate interactions and assumes a linear decrease in the energy of adsorption with surface coverage. The Temkin isotherm model is expressed the equation of formula (XVI).

$$q_e = \frac{RT}{b_T}\ln K_T + \frac{RT}{b_T}\ln C_e \qquad (XVI)$$

Figure 5C:
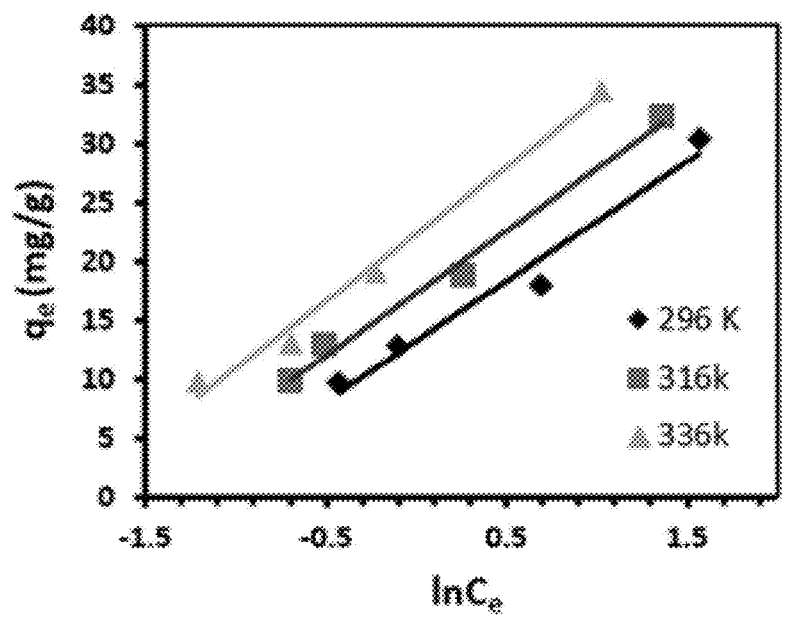
FIG. 5C is a Temkin adsorption isotherm for Ni (II) adsorption on the cross-linked cyclopolymeric resin compound 2 at an initial concentration of 40 ppm and different resin dosages.
Figure 6:
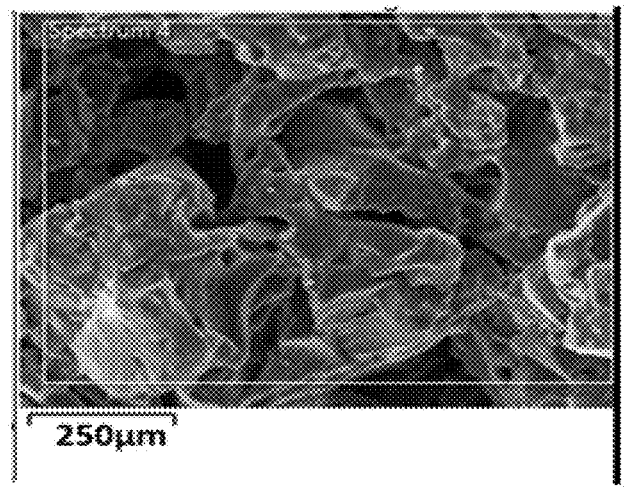
FIG. 6 is a scanning electron microscopy (SEM) image of the cross-linked cyclopolymeric resin compound 2.

In this formula, $b_T$ is the Temkin isotherm constant related to the heat of sorption (joule/mol), $K_T$ is the Temkin isotherm equilibrium binding constant (L/g) which is equal to the maximum binding energy (L/g), R is the gas constant (8.314×10-3 kJ/mol·K) and T is the absolute temperature (degrees Kelvin). The plot of $q_e$ versus $\ln C_e$ is illustrated in FIG. 5C and the isotherm constants were appropriately determined. The linear plot for the Temkin adsorption isotherm fits quite well with $R^2$ of 0.98.

Example 7

Thermodynamic Studies

The thermodynamic parameters ΔG° (standard free energy), ΔH° (enthalpy change) and ΔS° (entropy change) were calculated to determine the nature of the adsorption and are shown in Table 4. The experimental data obtained at different temperatures were used to calculate the thermodynamic parameters by a plot of ln Kc versus 1/T, by using the linear Van't Hoff equation of formula (XVII).

$$\ln K_c = \frac{\Delta S^0}{R} - \frac{\Delta H^0}{RT} \qquad (XVII)$$

The ΔG° (free energy change) was calculated using the equation of formula (XVIII).

$$\Delta G^0 = \Delta H^0 - T\Delta S^0 \qquad (XVIII):$$

In these formulas R is the gas constant of 8.314 kJ/mol·K, T is the absolute temperature in degrees Kelvin and $K_c = q_e/C_e$ (L/mg) is the standard thermodynamic equilibrium constant. The decrease in the ΔG° value with increasing temperature indicates that adsorption of the ion on the adsorbent becomes favorable at a higher temperature. The positive standard enthalpy change ΔH° of 23.2 kJ/mol suggests that the adsorption of Ni (II) on the resin is endothermic and this is supported by the increasing adsorption of Ni (II) with a temperature increase. The positive standard entropy change of 8.6 kJ/mol·K reflects the affinity of the resin towards nickel. It also reveals the increase in randomness at the solid-solution interface during the fixation of Ni (II) on the active motifs of the resin.

TABLE 4

Thermodynamic parameters for the adsorption of Ni (II) by the cross-linked cyclopolymeric resin compound 2 at different temperatures

| T (K) | ΔG° (kJ/mol) | ΔH° (kJ/mol) | ΔS° (kJ/mol) |
|---|---|---|---|
| 296 | −19.0 | | |
| 316 | −20.2 | 12.5 | 64.18 |
| 336 | −21.6 | | |

The activation energy of adsorption, $E_a$ (kJ/mol), is computed from the second order rate constant ($k_2$) obtained from the pseudo-second order kinetic model using the Arrhenius equation of formula (XIX).

$$\ln k_2 = -\frac{E_a}{R}\left(\frac{1}{T}\right) + \text{constant} \qquad (XIX)$$

In this formula $k_2$ is the second order rate constant in g/mg·h, R is the gas constant (8.314 J/mol·K) and T is the solution temperature in degrees Kelvin. The magnitude of $E_a$ gives an indication of the type of the adsorption process, physical or chemical. The physisorption process is readily reversible, equilibrium is attained rapidly and thus the energy requirements are small, ranging between 5 and 40 kJ/mol. The chemisorption mechanism is specific and involves stronger forces, and thus requires larger activation energy ranging from 40-800 kJ/mol [Unuabonah, E., K. Adebowale, and B. Olu-Owolabi, *Kinetic and thermodynamic studies of the adsorption of lead (II) ions onto phosphate-modified kaolinite clay*. Journal of Hazardous Materials, 2007. 144(1): p. 386-395.—incorporated herein by reference in its entirety].

The experimental data for the effect of contact time at various temperatures (296, 316 and 336 K) were used in assuming the pseudo-second order kinetics. The $k_2$ values at three temperatures were calculated from the slopes of $t/q_1$ against t at 296, 316 and 336 K. The slope of the plot was used to determine the activation energy as per the Arrhenius equation. The calculated value of apparent activation energy ($E_a$) was 15.8 kJ/mol. This indicates that the adsorption has a low potential barrier and can be assigned most likely to a physical sorption.

Example 8

Treatment of Real Wastewater Samples

A sample of industrial wastewater was used to study the effect of real water matrix and to evaluate a practical application of the resin. The samples were spiked with 0-20 mg/L of Ni (II) and then treated with the resin under the optimum conditions. The results are given in Table 5. The results indicate that the removal efficiencies of Ni (II) are hardly influenced by the real wastewater matrix. This qualifies the resin to have the potentials of both a highly efficient and renewable adsorbent for Ni (II) ions from aqueous solutions. Interestingly, the resin can additionally remove the highly toxic arsenic from wastewater.

TABLE 5

Comparison of Ni (II) concentrations in wastewater sample before and after the treatment with the cross-linked cyclopolymeric resin compound 2

| | Original | After treatment (µg L⁻¹) Original sample spiked with Ni (II) and then treated with the adsorbent | | |
|---|---|---|---|---|
| Metal | Sample (µg L⁻¹) | 0 | 10000 (µg L⁻¹) | 20000 (µg L⁻¹) |
| Ni | 2.03 | <MDL[a] | 1.38 | 1.84 |
| Co | 0.362 | <MDL | <MDL | <MDL |
| Cu | 22.1 | 3.18 | 2.38 | 2.82 |
| Zn | 9.14 | 0.028 | 0.581 | 1.98 |
| As | 8.14 | <MDL | <MDL | <MDL |
| Sb | 0.037 | <MDL | <MDL | <MDL |
| Pb | 0.453 | <MDL | <MDL | <MDL |

[a]MDL: the method detection limit

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A cross-linked cyclopolymeric resin of formula (I)

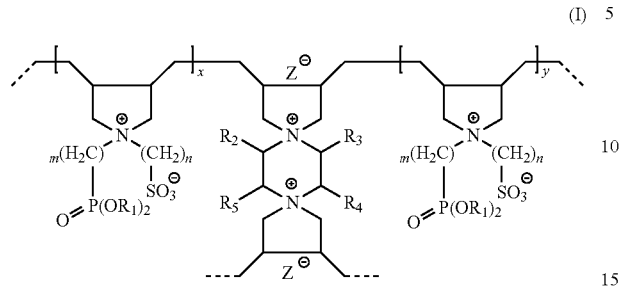

or a salt, solvate, tautomer or stereoisomer thereof;

wherein each $R_1$ is —H, a positive counter ion, an optionally substituted alkyl, an optionally substituted cycloalkyl, or an optionally substituted aryl;

$R_2$, $R_3$, $R_4$, and $R_5$ are independently —H, an optionally substituted alkyl, an optionally substituted cycloalkyl, or an optionally substituted aryl;

m and n are independently a whole number in the range of 1-10;

x and y are independently a whole number greater than zero; and

Z is a counter ion.

2. The cross-linked cyclopoymeric resin of claim 1, wherein the compound of formula (I) is

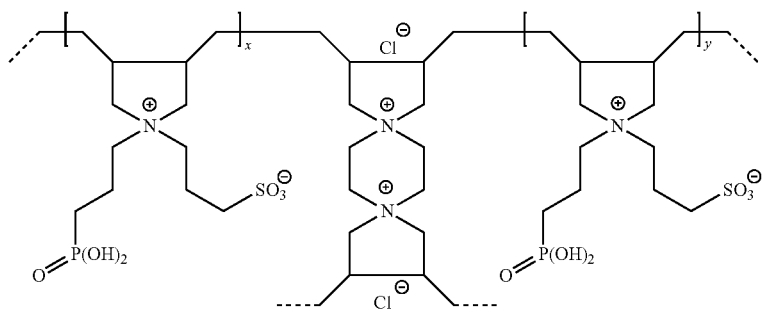

wherein x and y are independently a whole number greater than zero.

3. The cross-linked cyclopolymeric resin of claim 1, wherein the compound of formula (I) is

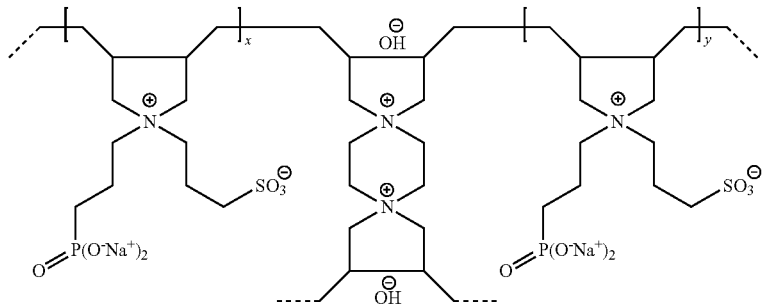

wherein x and y are independently a whole number greater than zero.

4. The cross-linked cyclopymeric resin of claim 1, wherein each $R_1$ is —H and the cyclopolymeric resin is polyzwitterionic or each $R_1$ is a positive counter ion and the cyclopolymeric resin is polyzwitterionic and dianionic.

5. A process for producing the cross-linked cyclopolymeric resin of claim 1, comprising:
   reacting a sultone with an esterified (diallylamino)alkylphosphonate followed by ester hydrolysis to form a N,N-diallyl quaternary ammonium monomer;
   reacting an allyl halide with a piperazine-based compound to form a tetraallylpiperazinium cross-linking monomer;
   cyclocopolymerizing the N,N-diallyl quaternary ammonium monomer and the tetraallylpiperazinium cross-linking monomer with a free radical initiator in a solvent to form a polyzwitterion cross-linked cyclopolymeric resin.

6. The process of claim 5, wherein the N,N-diallyl quaternary ammonium monomer has a structure of formula (II)

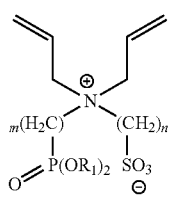

(II)

or a salt, solvate, tautomer or stereoisomer thereof;
wherein each $R_1$ is —H, a positive counter ion, an optionally substituted alkyl, an optionally substituted cycloalkyl, or an optionally substituted aryl; and
m and n are independently a whole number in the range of 1-10.

7. The process of claim 6, wherein the N,N-diallyl quaternary ammonium monomer compound of formula (II) is

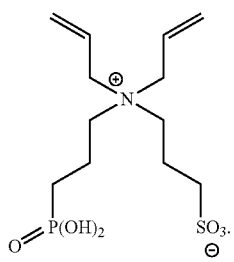

8. The process of claim 5, wherein the molar ratio of the N,N-diallyl quaternary ammonium monomer to the tetraallylpiperazinium cross-linking monomer is greater than 8:1.

9. The process of claim 5, wherein the tetraallylpiperazinium cross-linking monomer has a structure of formula (III)

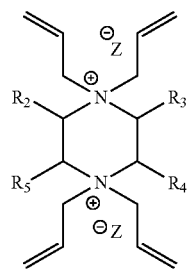

(III)

or a salt, solvate, tautomer or stereoisomer thereof;
wherein $R_2$, $R_3$, $R_4$, and $R_5$ are independently —H, an optionally substituted alkyl, an optionally substituted cycloalkyl, or an optionally substituted aryl; and
Z is a counter ion.

10. The process of claim 9, wherein the tetraallylpiperazinium cross-linking monomer compound of formula (III) is

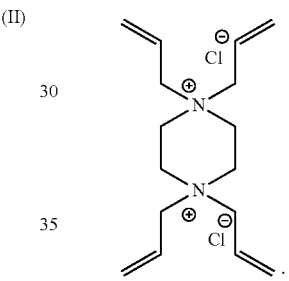

11. The process of claim 5, wherein the free radical initiator is tert-butyl hydroperoxide (TBHP).

12. The process of claim 5, wherein the cyclocopolymerizing is performed at a temperature of up to 100° C. for a period of up to 24 hours.

13. The process of claim 5, further comprising treating the polyzwitterion cross-linked cyclopolymeric resin after cyclocopolymerizing with a base to form a polyzwitterion/dianion cross-linked cyclopolymeric resin.

14. A method for removing heavy metals from an aqueous solution, comprising:
   contacting the cross-linked cyclopolymeric resin of claim 1 with an aqueous solution comprising at least one heavy metal; and
   adsorbing the heavy metal onto the cross-linked cyclopolymeric resin to form a heavy metal loaded cross-linked cyclopolymeric resin.

15. The method of claim 14, further comprising:
   desorbing the heavy metal from the heavy metal loaded cross-linked cyclopolymeric resin to reform the cross-linked cyclopolymeric resin; and
   reusing the cross-linked cyclopolymeric resin up to 15 times without a loss in adsorption capacity.

16. The method of claim 14, wherein the heavy metal is Ni (II).

17. The method of claim 14, wherein the cross-linked cyclopolymeric resin has an adsorption capacity of at least 30 mg of heavy metal per g of the cross-linked cyclopolymeric resin.

18. The method of claim 14, wherein the cross-linked cyclopolymeric resin is contacted with the aqueous solution at a concentration of 0.02-5.0 grams per liter of the aqueous solution at an aqueous solution pH range of 2-9.

19. The method of claim 14, further comprising agitating the aqueous solution at a speed of up to 200 rpm.

20. The method of claim 14, wherein up to 90% of the total mass of the heavy metal is removed from the aqueous solution.

\* \* \* \* \*